United States Patent [19]
Bettman

[11] Patent Number: 6,049,427
[45] Date of Patent: Apr. 11, 2000

[54] OPTICAL DEVICE ARRANGEMENTS UTILIZING SIMULTANEOUS ORTHOGONAL WALKOFF ELEMENTS

[75] Inventor: Ralph Bradford Bettman, Mountain View, Calif.

[73] Assignee: JDS Uniphase Corporation, San Jose, Calif.

[21] Appl. No.: 09/253,635

[22] Filed: Feb. 19, 1999

[51] Int. Cl.[7] .................................................. G02B 5/30
[52] U.S. Cl. ........................ 359/484; 359/495; 359/497; 359/499
[58] Field of Search ........................... 372/703; 359/484, 359/494, 495, 496, 497, 499

[56] References Cited

U.S. PATENT DOCUMENTS

| | | | |
|---|---|---|---|
| 5,204,771 | 4/1993 | Koga | 359/281 |
| 5,574,596 | 11/1996 | Cheng | 359/484 |
| 5,588,078 | 12/1996 | Cheng et al. | 372/703 |
| 5,734,763 | 3/1998 | Chang | 385/11 |
| 5,768,005 | 6/1998 | Cheng et al. | 359/484 |
| 5,930,422 | 7/1999 | Cheng | 359/495 |
| 5,973,832 | 10/1999 | Bettman | 359/484 |
| 5,982,539 | 11/1999 | Shirasaki | 359/484 |

FOREIGN PATENT DOCUMENTS

| | | | |
|---|---|---|---|
| 0087434 | 5/1984 | Japan | 359/496 |
| 0122624 | 6/1986 | Japan | 359/484 |
| 405061000A | 3/1993 | Japan | 359/494 |
| 405157993A | 6/1993 | Japan | 372/703 |
| 405241102A | 9/1993 | Japan | 359/496 |
| 405323233A | 12/1993 | Japan | 359/494 |

Primary Examiner—Cassandra Spyrou
Assistant Examiner—John Juba, Jr.
Attorney, Agent, or Firm—Mike Pritzkau; Stephen C. Shear

[57] ABSTRACT

Optical devices are described. These devices incorporate a walk-off arrangement along the device length configured for simultaneously moving orthogonal polarization components of a first light signal in at least first and second orthogonal directions. The walk-off configuration includes a junction formed between confronting members which define the first and second orthogonal walk-off directions. The walk-off arrangement defines the first and second orthogonal directions such that the orthogonal polarization components of the first light signal are moved in directions which include a component of movement away from the junction. In this way, contact of the polarization components with the junction attributable to beam spreading is avoided. Moreover, the component of movement away from the junction may serve to compensate for beam spreading in other layers and/or for movement in other layers of the polarization components towards one or more junctions defined in the other layers.

65 Claims, 15 Drawing Sheets

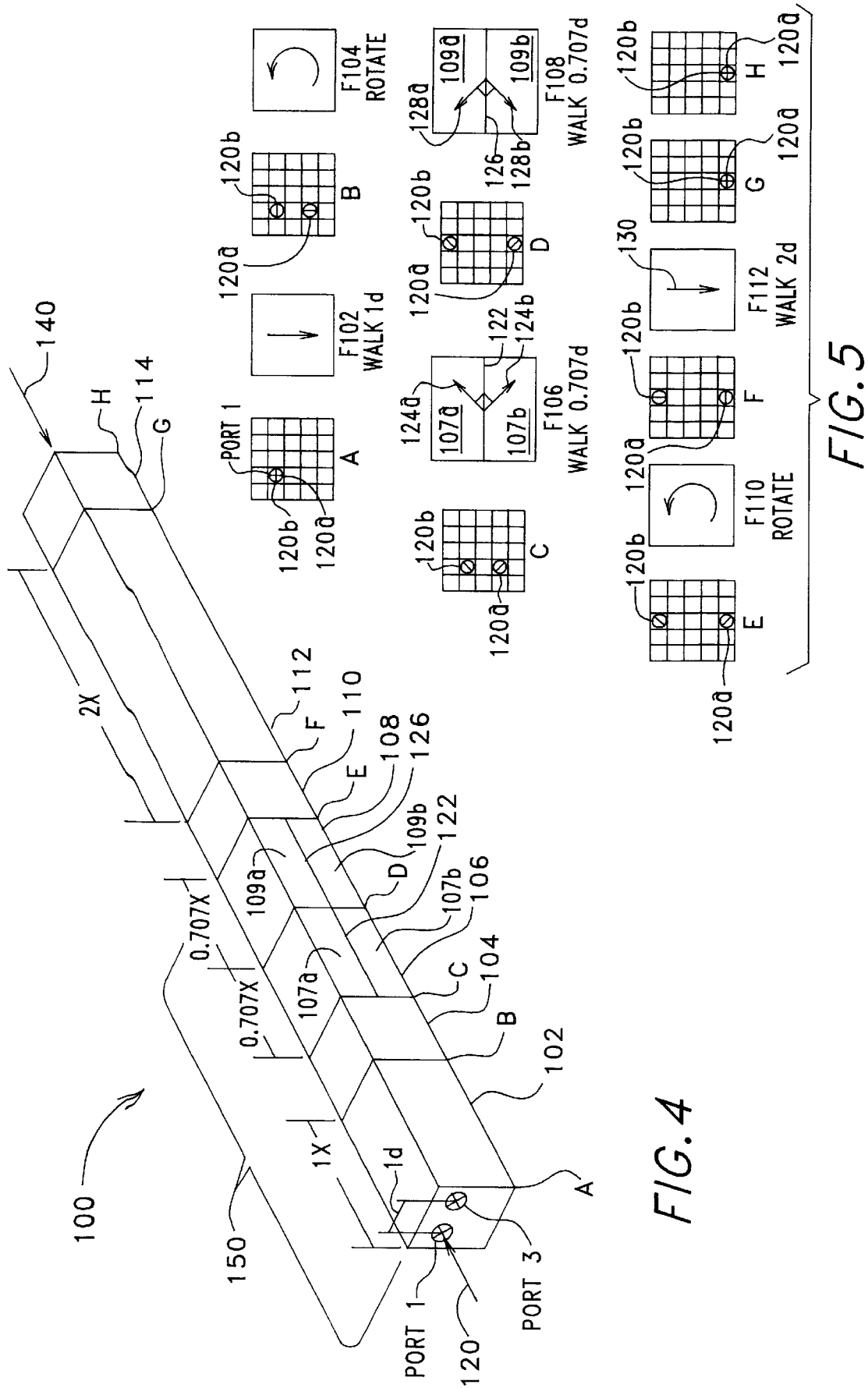

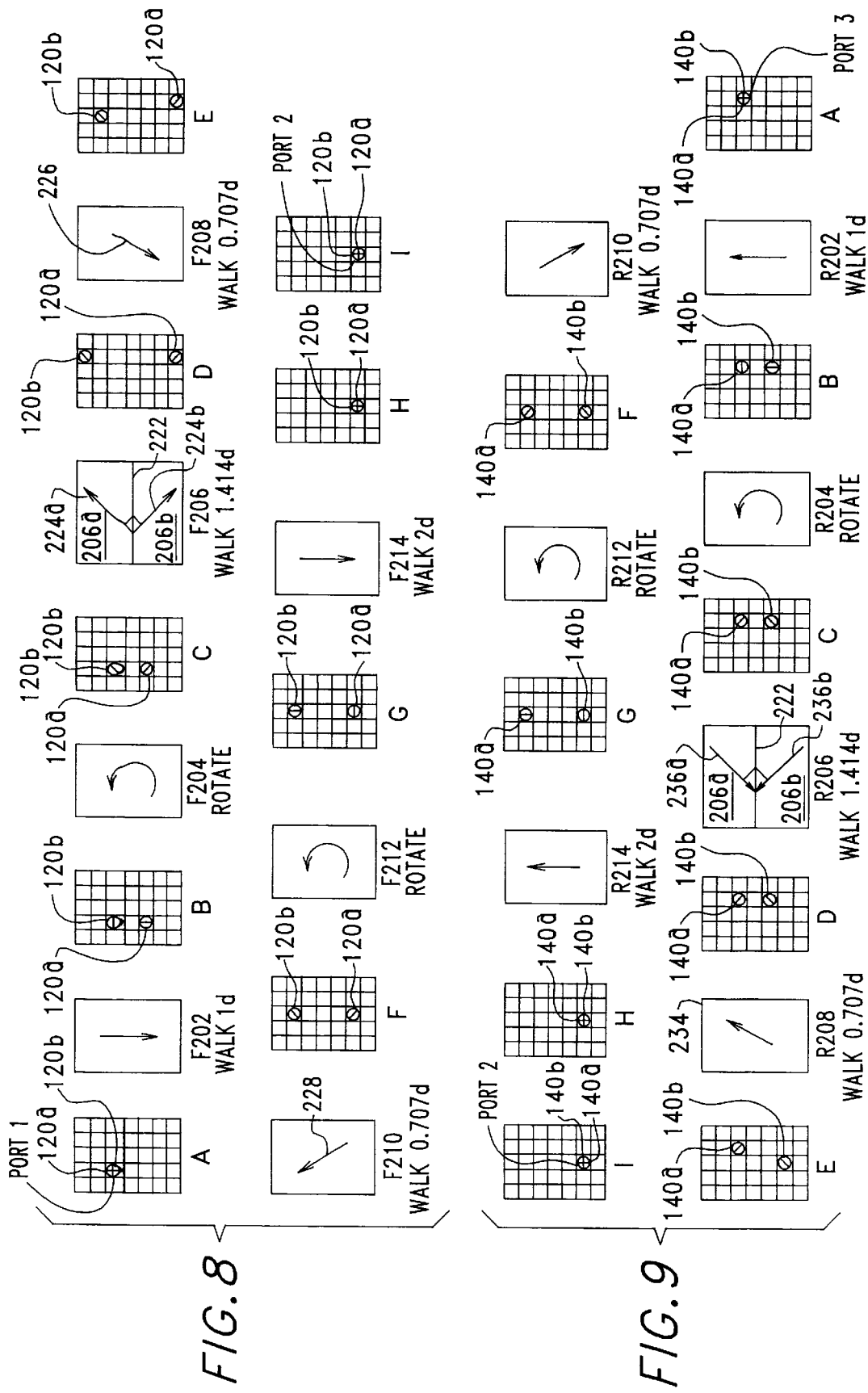

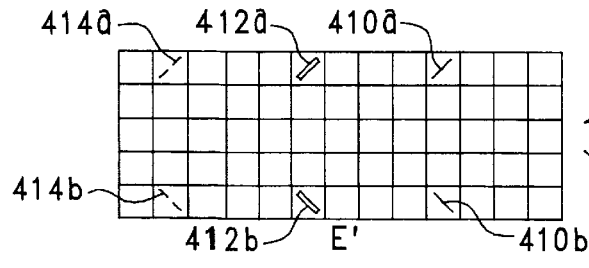
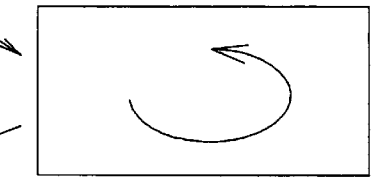
F406a—ROTATE 90°DEGREES
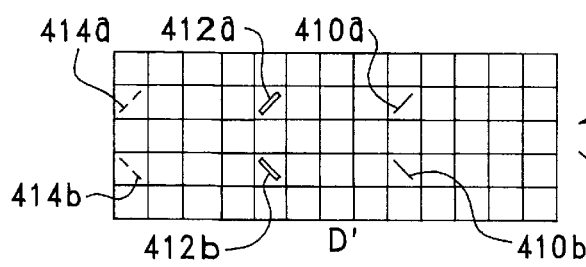
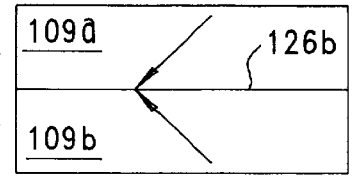
F108b—WALK 0.353d
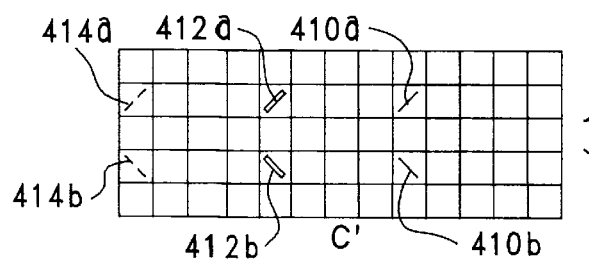
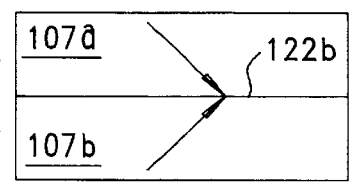
F106b—WALK 0.353d
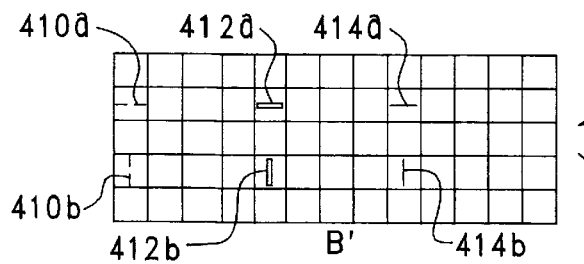
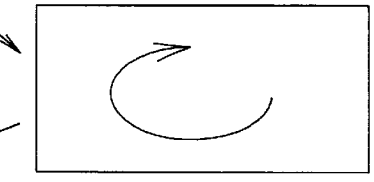
F104b—ROTATE 45°DEGREES CW
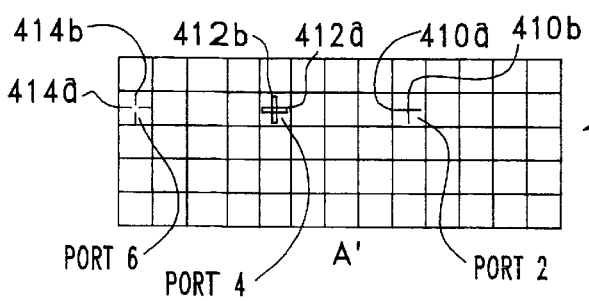
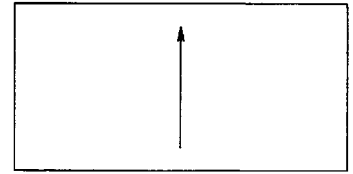
F102b—WALK 0.5d
FORWARD DIRECTION
FIG. 15

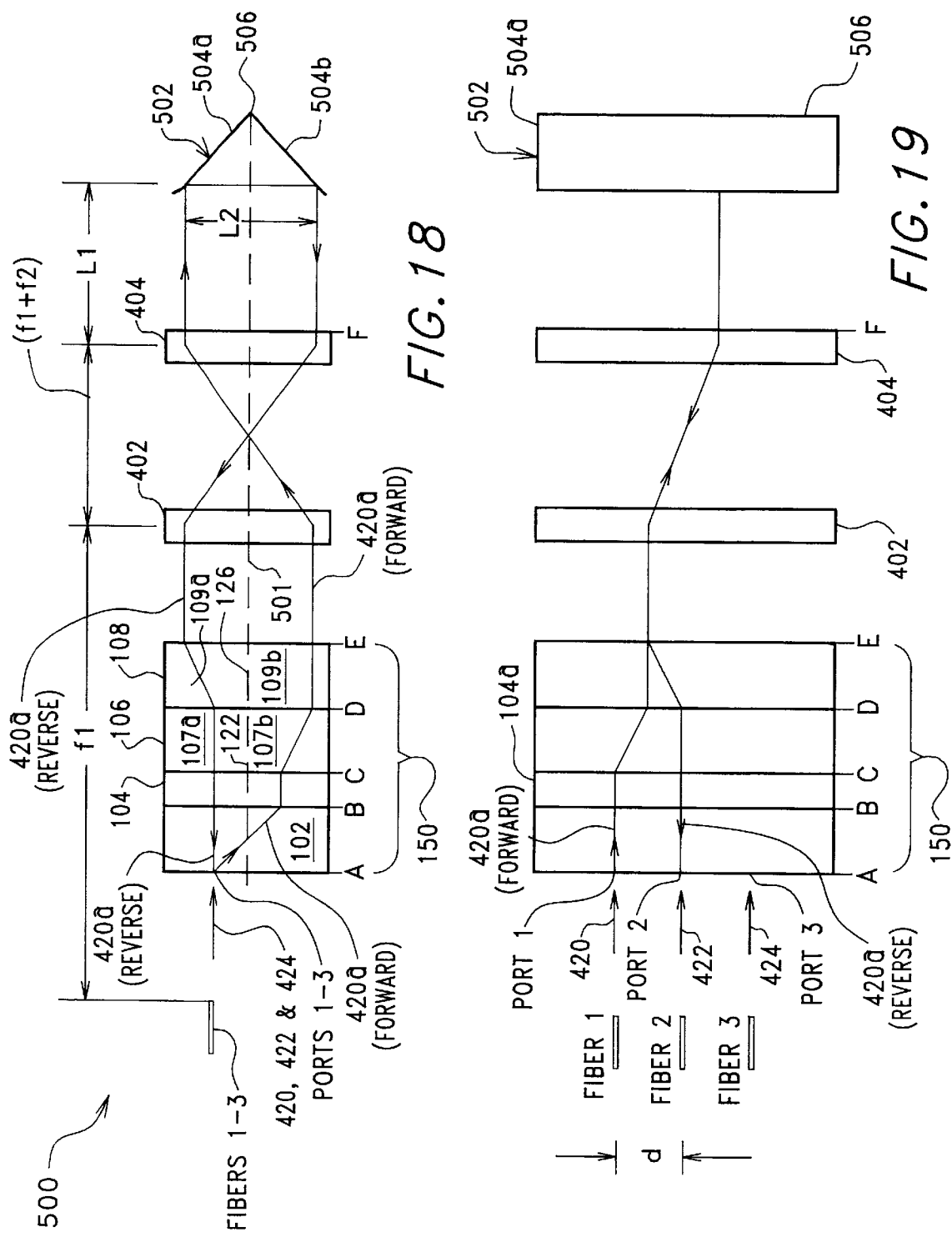

OPTICAL DEVICE ARRANGEMENTS UTILIZING SIMULTANEOUS ORTHOGONAL WALKOFF ELEMENTS

BACKGROUND OF THE INVENTION

The present invention relates generally to optical devices and, more particularly, to an optical device including an arrangement configured for producing simultaneous orthogonal walk-offs of light polarization components. The invention enjoys applicability in any device requiring routing of orthogonally polarized light signal components traveling at least at one point along two different light paths.

State of the art communications/data transmission systems increasingly rely upon the transfer of information in the form of light signals. These light signals are typically transmitted through optical fibers. Consequently, needs have arisen for interfacing with the optical fibers and for manipulating the light signals in certain ways outside of the fibers and returning the light signals to the fibers. In order to satisfy both of these needs, various functional types of optical devices have been developed. Such optical devices include, for example, optical circulators, optical switches and filters including add, drop and drop-add configurations.

One example of a prior art optical circulator is shown in FIG. 1. The latter is a reproduction of FIG. 2a taken from U.S. Pat. No. 5,574,596 showing an optical circulator generally indicated by the reference numeral 10. Initially, it should be noted that circulator 10 is formed from various layers of crystalline material. The circulator includes an input arrangement 12 and an identical output arrangement 14. A polarization shifting arrangement 16 is positioned between the input and output arrangements and comprises first and second birefringent walkoff crystals 18a and 18b which may be referred to hereinafter as a birefringent crystal pair. During operation, optical circulation is provided between three ports, as indicated by the reference numbers 20a, 20b and 20c, respectively. It should be noted that an interface surface 22 is defined by the birefringent crystal pair.

Referring to FIG. 2 in conjunction with FIG. 1, walkoff crystal 18a includes a first walkoff direction 24a while walkoff crystal 18b includes a second walkoff direction 24b. In this regard, it should be noted that the first and second walkoff directions oppose one another and are generally parallel with interface surface 22. Moreover, it should also be noted that other devices have been seen in the prior art which possess crystal pairs forming interface surfaces in the manner illustrated by FIG. 1. See, for example, U.S. Pat. No. 5,204,771 which discloses a polarization rotation crystal pair.

Referring again to FIG. 1, it is submitted that a particular disadvantage is associated with circulator 10. Specifically, an unfocused beam of light injected into any of ports 20 must initially pass through either input arrangement 12 or output arrangement 14. In either case, the beam will exhibit expansion by the time it reaches the birefringent crystal pair. Further beam expansion will then occur as the beam passes through the birefringent crystal pair. Unfortunately, polarization components of the beam are likely to interact with interface 22 as a result of the beam expansion. The result of this interaction is signal "clipping" wherein a portion of the beam power is undesirably lost. Therefore, it is submitted that any practical implementation of the device shown in FIG. 1 will require external focusing components (not shown) such as, for example, lenses which serve to focus light emitted by fiber optic cables into the circulator body in compensation for beam expansion. However, it should be appreciated that the lenses required for this focusing necessitate an undesirably large beam separation. That is, the lateral distance between ports 20a and 20b must be large enough to accommodate the lenses. The beam separation necessitated by the lenses itself establishes the amount of walkoff which must be produced by walkoff elements within the overall assembly with respect to walking beams or components thereof to a common path from two different paths. Therefore, the use of focusing lenses leads to a direct increase in the length of the walkoff elements required. In this regard, it should be appreciated that such an increase in the length of the walkoff elements also increases manufacturing costs since the cost of such elements is strongly related to their volume.

Still considering the circulator of FIG. 1, one advantage associated therewith, as recognized by Applicant, is worthy of mention for purposes of later reference. In particular, the device may be expanded to accommodate additional light signals and/or circulator configurations by simple extension of the lateral extents of the device along the direction defined between ports 20a and 20c.

Turning now to FIG. 3, a more recent class of optical devices has been developed as indicated by reference number 30. FIG. 3 is a partial representation of FIG. 1E from U.S. Pat. No. 5,734,763. Device 30 includes a front end 32 in optical communication with a device body 34. Front end 32 includes first and second birefringent crystal pairs 34 and 36. Crystal pair 34 includes first and second birefringent crystals 38a and 38b which are in physical contact in the overall final assembly of the device whereby to form a first interface surface/region as defined by adjacent surfaces 40a and 40b. The first and second crystals further include first and second walkoff directions which are parallel to surfaces 40a and 40b in opposing first and second directions as indicated by arrows 42a and 42b, respectively. Second crystal pair 36 includes third and fourth birefringent crystals 46a and 46b which, like the first crystal pair, are in physical contact in the overall final assembly of the device so as to form a second interface surface/region as defined by adjacent surfaces 48a and 48b. The third and fourth crystals include third and fourth walkoff directions indicated by arrows 49a and 49b that are parallel to surfaces 48a and 48b. During operation, light may be emitted into or received from the device as constrained by the presence of the interface surfaces. That is, any light signal which passes through front end 32 will experience clipping if the signal impinges on either of the interface surfaces. It should be appreciated that the first and second interface surfaces are in an orthogonal orientation with respect to one another such that front end 32 is, in essence, divided into four quadrants (not specifically indicated in the Figure). Therefore, in order to avoid clipping, as it passes through front end 32 a signal must remain sufficiently far away from the interface surfaces. As an example of ports on the front end, in the instance of a circulator, port 1 may be defined, as indicated by reference number 50, at a suitable location on crystal 38b for one quadrant while port 3 may be defined, as indicated by reference number 52, at a suitable location on crystal 38a for an orthogonally opposed quadrant.

While the device of FIG. 3 is well suited for its intended purpose, it should be appreciated that the device is not linearly expandable in the manner described above with regard to circulator 10 of FIG. 1. That is, the orthogonal arrangement of the interface surfaces defined by the first and second birefringent crystal pairs removes the potential for linear expansion of the device by simple expansion of the dimensions of the device along one axis, as may be done in the instance of the device described in FIG. 1. One of ordinary skill in the art may suggest that the device of FIG. 3 will exhibit a problem similar to that of the device of FIG. 1 with regard to signal clipping. However, the clipping problem is alleviated in the FIG. 3 device primarily due to the fact that front end 32 itself defines the ports, at least at one end of the device, such that the signals pass the interface surfaces before significant beam expansion can take place. That is, relatively low levels of beam expansion are present at the front end where the interface surfaces are located. For the same reason, the need for input lenses is thought to be reduced in device 30 of FIG. 3. Thus, the devices of both FIGS. 1 and 3 exhibit significant, yet independent problems and advantages.

The present invention provides a class of optical devices which serve to eliminate the problems described above with regard to FIGS. 1 through 3 in a heretofore unseen and highly advantageous way. That is, the disclosed devices couple the advantage of avoiding signal clipping at crystal interface surfaces in compact package with the advantage of providing linear expansion of the device along a single dimension for the purpose of processing additional light signals in a cost effective manner.

SUMMARY OF THE INVENTION

As will be described in more detail hereinafter, there are disclosed herein optical devices and an associated method. These devices, like the prior art devices illustrated in FIGS. 1–3, include a main body which is designed to act on light signals passing therethrough and which has (i) a first end defining at least a first port and a second, opposing end and (iii) a length between the first and second ends along which the light signal travels. In one aspect of the invention, the improvement comprises a walk-off arrangement arranged along the device length and configured for simultaneously moving orthogonal polarization components of a first light signal in at least first and second orthogonal directions.

In another aspect of the invention, an optical device is designed to perform a predetermined function on at least a first light signal passing therethrough, which first light signal is polarizable into first and second orthogonal components. The device includes a first end having a first port for receiving the first light signal, an opposing second end and a length therebetween along which the first light signal travels. The device includes a first arrangement defining the first port and positioned along the aforementioned device length including a walk-off configuration for simultaneously moving the orthogonal polarization components of the first light signal in first and second orthogonal directions to perform at least one step in providing the predetermined function. A second arrangement of optical elements is positioned along the device length so as to define the second end of the device and being in optical communication with the first arrangement for cooperating with the first arrangement in a way which implements other steps in providing the predetermined function.

In still another aspect of the invention, the walk-off configuration includes a junction formed between confronting members which define the first and second orthogonal walk-off directions. The walk-off arrangement defines the first and second orthogonal directions such that the orthogonal polarization components of the first light signal are moved in directions which include a component of movement away from the junction. In this way, contact of the polarization components with the junction attributable to beam spreading is avoided. Moreover, the component of movement away from the junction may serve to compensate for beam spreading in other layers and/or for movement in other layers of the polarization components towards one or more junctions defined in the other layers.

BRIEF DESCRIPTION OF THE DRAWINGS

The present invention may be understood by reference to the following detailed description taken in conjunction with the drawings briefly described below.

FIG. 4 is a diagrammatic perspective view of a first optical device manufactured in accordance with the present invention, shown here to illustrate the overall structure of the device.

FIG. 5 is a diagrammatic illustration showing interface surfaces adjoining the seven layers which make up the circulator of FIG. 4 indicating the orientations of orthogonal polarization components of a forward traveling light beam and also showing function diagrams depicting walk-off and rotation functions performed by each layer on the forward traveling light beam.

FIG. 8 is a diagrammatic illustration showing interface surfaces adjoining the eight layers which make up the circulator of FIG. 7 to indicate the orientations of orthogonal polarization components of a forward traveling light beam and also showing function diagrams depicting walk-off and rotation functions performed by each layer on the forward traveling light beam.

FIG. 9 is a diagrammatic illustration again showing interface surfaces adjoining the eight layers which make up the circulator of FIG. 4, but now showing the surfaces to indicate the orientations of orthogonal polarization components of a reverse traveling light beam and also showing function diagrams depicting walk-off and rotation functions performed by each layer on the reverse traveling light beam.

FIG. 15 is a diagrammatic illustration continuing from FIG. 14 showing surface diagrams at positions not shown in FIG. 14 along with the orientations of the forward traveling beams at those surfaces.

FIG. 18 is a diagrammatic side view of a fourth optical device manufactured in accordance with the present invention, shown here to illustrate the structure of the device.

FIG. 19 is a diagrammatic top view of the device of FIG. 18 shown here to illustrate further details of the overall structure of the device.

DETAILED DESCRIPTION OF THE INVENTION

Figure 1:
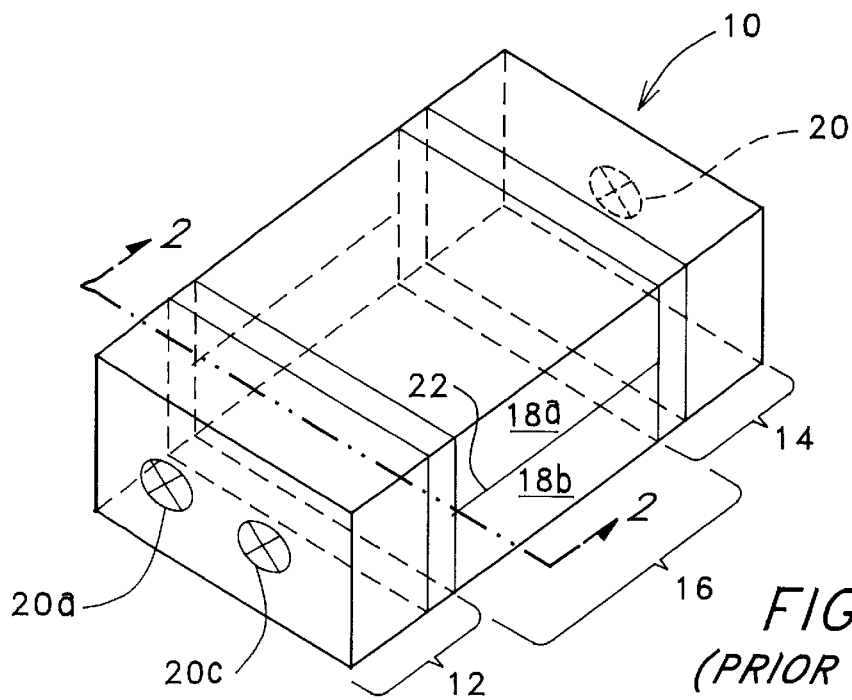
FIG. 1 is a diagrammatic perspective view of a first prior art circulator which is representative of FIG. 2a from U.S. Pat. No. 5,574,596 illustrating the overall structure of the circulator.
Figure 2:
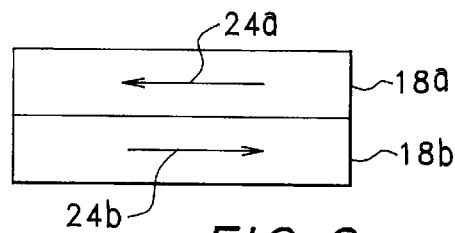
FIG. 2 is a diagrammatic end view of a pair of birefringent crystals which are centrally located in the circulator of FIG. 1 shown here to illustrate the arrangement of walk-off directions of the crystals.
Figure 3:
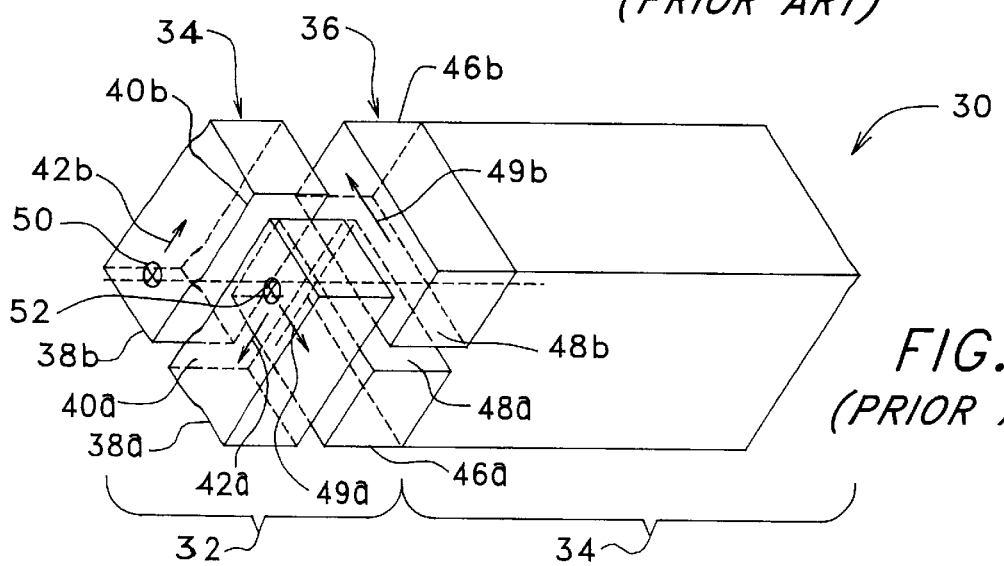
FIG. 3 is a diagrammatic perspective view of a prior art circulator which is representative of FIG. 1E from U.S. Pat. No. 5,734,763 illustrating the overall structure of the circulator including a polarization mixing arrangement which prohibits linear expansion of the device.

Having previously described FIGS. 1–3, attention is immediately directed to FIG. 4 which illustrates a first optical device manufactured in accordance with the present invention and generally indicated by the reference numeral 100. In this instance, optical device 100 comprises an optical circulator and will be referred to as such hereinafter. It is noted that like reference numbers will be used to refer to like components wherever possible throughout the various Figures. Circulator 100 incorporates a series of stacked optical elements in the form of substrates defining parallel planar surfaces. Specifically, the circulator is comprised of a series of seven layers indicated by the reference numbers 102, 104, 106, 108, 110, 112 and 114. The visible end surface of the circulator is designated by the letter "A" while the opposite end surface of the circulator is designated by the letter "H". Intermediate surfaces which lie between surfaces A and H are designated by the letters B through G. Specific details regarding the composition of each layer will be provided at appropriate points hereinafter.

Referring to FIGS. 4 and 5, surface A of layer 102 defines port 1 and port 3 of the circulator. Port 2 is defined by surface H of layer 114 at the opposite end of the circulator, however, this latter port is not visible in the present Figure. For ideal operation, a forward traveling signal injected into port 1 should appear in its entirety at port 2 while a reverse traveling signal injected into port 2 should appear in its entirety at port 3 with no mixing of the two light signals. The seven layers which make up the overall circulator include both polarization rotation layers and birefringent layers. The thicknesses of birefringent layers are indicated in the Figure in terms of the quantity "X" which is established by the walk-off characteristics of the material which is used to form these layers. A length of birefringent material of 1X fabricated so as to provide walk-off will walk-off a beam of the correct polarization orientation by an amount "d". Ports 1 and 3 are separated by a distance of 1d for reasons which will become apparent hereinafter. Each of surfaces A through H is diagrammatically illustrated including the polarization orientation of orthogonal components of a light beam 120 that is received by port 1 traveling in a forward direction consistent with the direction of the arrow used to denote the light beam. Between each of the depicted surface diagrams, function diagrams F102, F104, F106, F108, F110, F112 and F114 correspond to the reference numbers of the seven device layers and diagrammatically illustrate the functional step performed within the associated layer. Function diagrams F106 and F108 are enlarged relative to the other function diagrams for emphasizing certain aspects of the present invention. No function diagram is associated with layer 114 since this layer comprises a phase delay compensation layer that preferably has no influence upon polarization orientation.

Aside from the phase delay compensation layer, it should be appreciated that two different types of steps are performed by the layers of circulator 100. Specifically, walk-off steps are performed using birefringent or double refraction crystals while polarization rotation steps are performed using Faraday materials. With regard to birefringent crystals, such crystals include an ordinary axis and an extraordinary axis wherein light polarized along the ordinary axis passes straight through the crystal while light polarized along the extraordinary axis is translated in what is commonly referred to as a walk-off direction. Details regarding production of such crystals with regard to orienting the ordinary and extraordinary axis in desired directions will not be provided herein since techniques for doing so are well known in the art. Materials suitable for use as walk-off layers include, but are not limited to calcite, rutile or vanadate. As shown on the surface A diagram, beam 120 can be resolved into orthogonal first and second components 120a and 120b, respectively. In this regard, it should be appreciated that all optical device embodiments disclosed herein are polarization independent. Moreover, orthogonal polarization along horizontal and vertical axes is arbitrary and reference to directions in the various figures such as "horizontal" and "vertical" are utilized for illustrative purposes only. It is to be understood that these devices may operate in any orientation. Walk-off directions are indicated in the function diagrams of FIG. 4 using arrows and with a point of view looking in the direction of travel of beam 120. Thus, a polarization orientation which is parallel to the walk-off direction will experience the walk-off. At this point, it is appropriate to note that a walk-off material having a 1X thickness will move the appropriate polarization component either vertically or horizontally by two grid positions within the matrix of illustrated positions in each of the surface diagrams of FIG. 5 such that the grid spacing is equal to (0.5)d. The thicknesses or type of material for each of the layers may vary so long as the requisite functionality of the layer is maintained.

Referring to FIGS. 1, 4 and 5, it should be emphasized that the present invention contemplates providing beam 120 without the need for external focusing lenses or any other focusing element which would itself determine the required separation between ports 1 and 2 on surface A. At the same time, the provision of a focusing element (not shown) such as, for example, a thermally expanded core fiber (hereinafter TEC) is considered to be acceptable since such fibers include a sufficiently small diameter which will not in itself influence the separation of port 1 and port 2 on surface A. Moreover, the use of TEC fibers is considered to be acceptable with all embodiments disclosed herein. In this regard, the reader is reminded of discussions appearing above with reference to FIG. 1 wherein it is submitted that a practical implementation of circulator 10 of FIG. 1 would require the provision of external lenses that establish the separation of ports 1 and 2. This need for external focusing lenses in prior art circulator 10 initially arises due to centrally located walk-off crystals 18a and 18b defining interface surface 22 therebetween. That is, the polarization components expand upon passing through input arrangement 12 prior to reaching the centrally located walk-off crystals 18a and 18b. Thereafter, as the beam passes through walk-off crystals 18a and 18b, still further expansion of the beam's polarization components occurs. The initial expansion coupled with further expansion in crystals 18a and 18b equates to a level of beam expansion which merits attention since the polarization components of the beam are likely to undesirably encounter interface surface 22. For reasons to be described, the present invention greatly reduces the need for external focusing lenses in a highly advantageous and heretofore unseen way in configurations where it is desirable for beam polarization components to initially pass through one or more crystals prior to encountering a layer which defines an internal interface. Moreover, the present invention may be employed in other instances when there is a need to prevent a contact of polarization components with an interface surface or with other structural impediments. This advantage and still further advantages provided by the present invention will be described hereinafter.

Continuing with a description of circulator 100 with reference to FIGS. 4 and 5, in layer 102, component 120a of beam 120 is walked downward by 1d, as shown in function diagram F102, prior to its arrival at surface B. The polarization components then enter layer 104 which comprises a non-reciprocal polarization rotation layer that rotates the components counter clockwise by 45 degrees prior to the components arriving at surface C. Layer 104 and other polarization rotation layers throughout this disclosure may be formed from suitable materials such as, for example, gadolinium-garnet and bismuth substituted yttrium-iron garnet. Thereafter, layer 106 is entered.

In accordance with the present invention, layer 106 includes first and second birefringent crystals 107a and 107b. These latter birefringent crystals define an interface surface 122 (appearing as a line in F106 and in FIG. 4) which lies generally parallel to the direction of travel of light beam 120. Crystals 107a and 107b include first and second walk-off directions 124a and 124b, respectively, oriented as shown in F106. Specifically, walk off directions 124a and 124b are orthogonal with respect to one another such that each walk-off direction forms approximately a 45° angle with interface surface 122. Therefore, polarization components 124a and 124b are simultaneously moved away from one another and away from interface surface 122, while also being moved in a direction which is parallel to interface surface 122. It should be appreciated that moving the polarization components away from interface surface 122 is highly advantageous for two reasons. First, even though beam expansion continues to occur in layer 106, simultaneous with movement away from interface surface 122, the rate of movement away from the interface surface not only far exceeds the rate of beam expansion, but also readily compensates for the initial expansion experienced in layers 102 and 104 such that interference with interface surface 122 may be substantially avoided. Therefore, by moving polarization components 124a and 124b away from interface surface 122, the concern for interference caused by the polarization components impinging upon the interface surface has been virtually eliminated. Second, it should be appreciated that after having moved the polarization components away from one another and from the interface surface, the polarization components may enter a subsequent layer which itself includes a subsequent interface surface. The polarization components may then pass through such a subsequent layer without the need to move the polarization components still further from the subsequent interface surface in order to compensate for beam expansion in the subsequent layer, since the initial movement away from interface surface 122 can be designed to also compensate for beam expansion in one or more subsequent layers. This second reason is illustrated by layer 108, as will be described below.

Still referring to FIGS. 4 and 5, layer 108 includes first and second birefringent crystals 109b and 109b defining an interface surface 126 (appearing as a line in F108 and in FIG. 4) which, like interface surface 122 of layer 106, also lies generally parallel to the direction of travel of light beam 120. Crystals 109b and 109b include walk-off directions 128a and 128b, respectively, oriented as shown in function diagram F106. Walk off directions 128a and 128b are orthogonal with respect to one another such that each walk-off direction forms approximately a 45° angle with interface surface 126. The polarization components enter layer 108 with component 120b entering crystal 109b and component 120a entering crystal 109b. However, in both instances, the polarization orientation of each light beam component is orthogonal to the walk-off direction of the crystal which it enters. Therefore, neither of the forward traveling polarization components experience a walk-off in layer 108 (see F108). Further descriptions of layer 108 will be provided below in conjunction with a discussion of light traveling in the reverse direction.

After passing through layer 108, light polarization components 120a and 120b arrive at surface E whereby to enter layer 110. This latter layer comprises a non-reciprocal polarization rotation layer which rotates polarization components 120*a* and 120*b* by 45 degrees in a counter clockwise direction as shown by F110 prior to the components arriving at surface F. The polarization components then enter walk-off layer 112 which provides a 2d walk for polarization component 120*a* in the downward direction in FIG. 5 as indicated by an arrow 130. Thus, at surface G, polarization components 120*a* and 120*b* are recombined. The components then pass through phase compensation layer 114 to arrive at port 2 on surface H. The phase delay compensation layer serves to restore temporal coherence to the two polarization components as they pass through the overall circulator. This layer may be formed from suitable materials including, but not limited to calcite, vanadate, rutile, or quartz.

Figure 6:
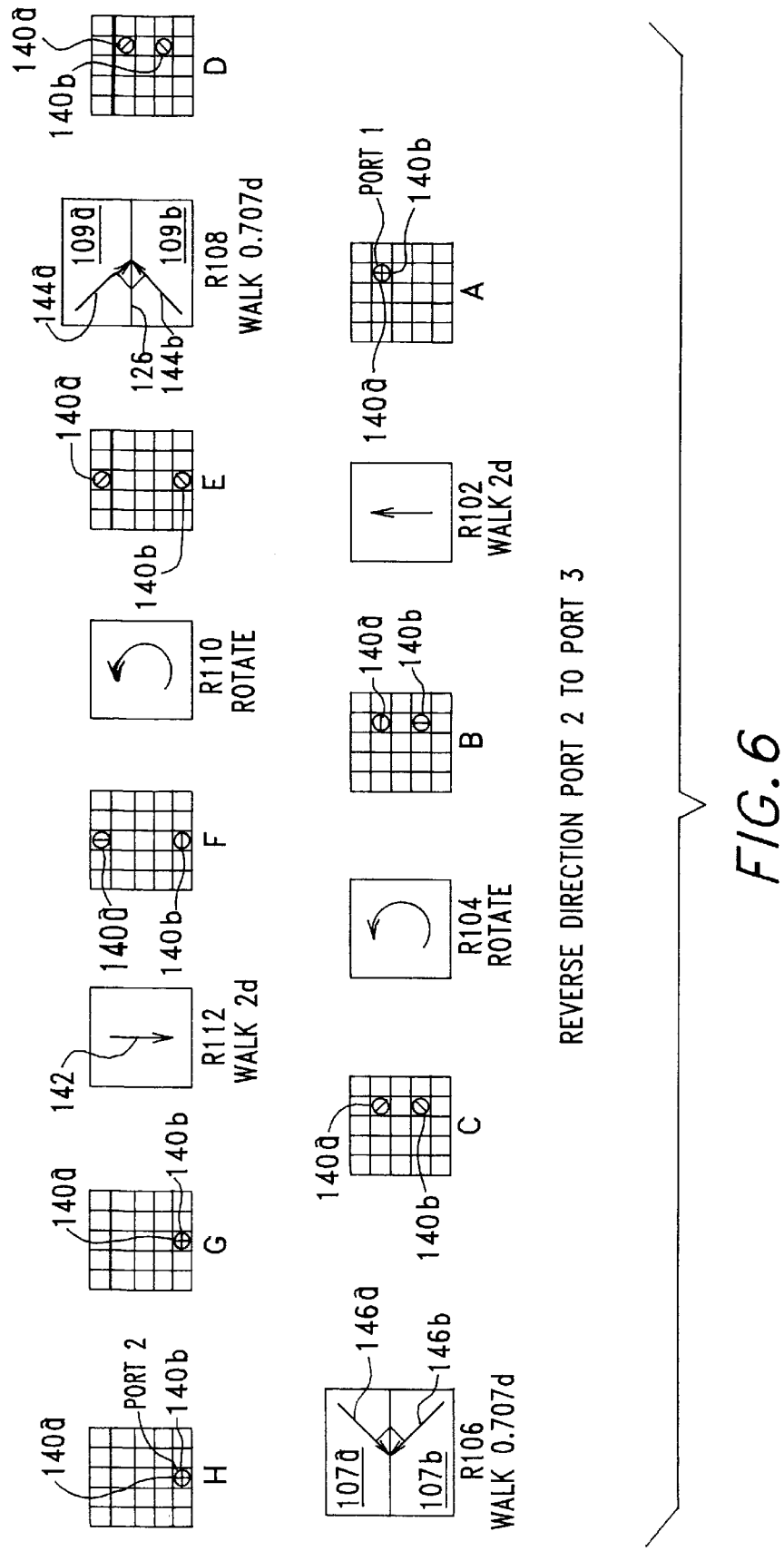
FIG. 6 is a diagrammatic illustration again showing interface surfaces adjoining the seven layers which make up the circulator of FIG. 4, but now showing the surfaces to indicate the orientations of the orthogonal polarization components of a reverse traveling light beam and also showing function diagrams depicting walk-off and rotation functions performed by each layer on the reverse traveling light beam.

Having described the travel of beam 120 in the forward direction, travel of a light beam 140 will now be described in the reverse direction with reference to FIGS. 4 and 6. beam 140 is polarizable into first and second orthogonal polarization components 140*a* and 140*b*. Like FIG. 5, FIG. 6 includes function diagrams for purposes of illustrating the effects of each layer on specific light polarizations. However, the function diagrams are designated in this instance by the letter "R" followed by the reference number of the associated layer wherein R indicates travel in the reverse direction in accordance with beam 140. The reader is reminded that all illustrations in FIG. 6 assume the same viewpoint as those of FIG. 5. That is, looking in the forward direction. Moreover, FIG. 6 is consistent with FIG. 5 in that a walk-off material having a 1X thickness will move the appropriate polarization component, for example, vertically or horizontally by two grid positions within the matrix of illustrated positions in each of the surface diagrams of FIG. 6. After entering phase delay compensation layer 114 at port 2, as defined on surface H, beam 140 arrives at surface G with the locations of the polarization components unchanged since the phase compensation layer preferably has no discernible influence other than that of offsetting the phase mismatches between the two components that have developed as one or the other have undergone walk-offs in the overall device. Thereafter, the polarization components enter walk-off layer 112 which provides a 2d walk for polarization component 140*a* in the upward direction as indicated by an arrow 142 in function diagram R112 of FIG. 6. After passing through layer 112, light polarization components 140*a* and 140*b* arrive at surface F whereby to enter non-reciprocal polarization rotation layer 110 which rotates polarization components 140*a* and 140*b* by 45 degrees in a counter clockwise direction as shown in R110 prior to the components arriving at surface E.

The polarization components traveling in the reverse direction then enter layer 108 with component 140*a* entering crystal 109*a* and component 140*b* entering crystal 109*b*. Walk-offs for this reverse direction in crystals 109*a* and 109*b* are indicated by arrows 144*a* and 144*b*, respectively, in function diagram R108. Of course, these walk-off directions are in parallel but opposing directions to the corresponding directions shown in function diagram F108 of FIG. 5 for the reverse direction of light beam travel. Therefore, directions 144*a* and 144*b* are orthogonal with respect to one another and angled towards interface surface 126 at 45 degrees such that both polarization components are simultaneously walked diagonally towards and parallel to interface surface 126 so as to be positioned in the locations shown in surface diagram D upon arrival at this surface. Even though the polarization components of the reverse traveling beam are moved, in this instance, towards interface surface 122, it should be appreciated that the polarization components of both forward traveling beam 120 and reverse traveling beam 140 are sufficiently widely separated within layer 108 so as to avoid substantial contact with interface surface 122. Layer 106 serves to further increase the moderate spacing of the components of a forward traveling beam and layer 108 serves to reduce the spacing of the already widely spaced components of the backward traveling beam. Only one of these layers, however, can be placed nearer to the front end of the device; in this example layer 106 is located nearest the front of the crystal assembly. By acting on the forward traveling beam using crystal pair 106, which is first encountered, compensation is immediately provided for effects such as, for example, beam spreading which are of concern immediately thereafter in crystal pair 108. Hence, the (forward traveling) beam whose components are translated by the crystal pair nearer the front end of the device enjoys a large amount of clearance away from the interface surfaces of both layers, while the (reverse traveling) beam whose components are acted upon by the second crystal pair (i.e., layer 108) must pass through the first pair of crystals at a spacing controlled by layer 102 such that even the components of the reverse traveling beam enjoy sufficient separation from the interface surfaces in both layers 106 and 108. As mentioned above, the orthogonally arranged walk-off directions of crystals 107*a* and 107*b* advantageously compensate for beam spreading which occurs throughout circulator 100 in layers which include an interface surface such as layers 106 and 108 here.

After passing through layer 108 in the reverse direction, the polarization components of beam 140 then enter layer 106 such that component 140*a* passes through crystal 106*a* while component 140*b* passes through crystal 106*b*. Walk-offs for this reverse direction in crystals 106*a* and 106*b* are indicated by arrows 146*a* and 146*b*, respectively, in function diagram R106. Again, these walk-off directions are in parallel but opposing directions to the corresponding directions shown in function diagram F106 of FIG. 5 for the reverse direction of light beam travel. Therefore, directions 146*a* and 146*b* are orthogonal with respect to one another and angled towards interface surface 126 at 45 degrees. However, in the case of each crystal, the walk-off direction is orthogonal to the polarization orientation of the polarization component passing therethrough such that walk-off is not experienced by the polarization components and the components arrive at unchanged positions on surface diagram C. In layer 104, polarization components 140*a* and 140*b* are rotated by 45 degrees in a counter clockwise direction per function diagram R104 to orient polarization component 140*a* in a horizontal direction and component 140*b* in a vertical direction. Thereafter, in layer 102, polarization component 140*b* is walked vertically upward by 1d as shown in R102 such that polarization components 140*a* and 140*b* are recombined at surface A, completing travel of beam 140 from port 2 to port 3.

Having described the structure of circulator 100 and the travel of light beams between its ports in both the forward and reverse directions, it is now appropriate to mention that layers 102, 104, 106 and 108 comprise a highly advantageous polarization mixing arrangement which is indicated in FIG. 4 by the reference number 150. As will be seen, polarization mixing arrangement 150 is useful in a number of different device configurations several of which will be described hereinafter. It should also be mentioned that the present invention recognizes that in optical devices such as, for example, circulators there exists a beam "centroid"

which can be defined as the center point of an imaginary line drawn between the centers of the separated orthogonal polarization components of a particular light beam. With regard to beam centroids, it is considered herein that beam path overlap occurs when the centroids of two different beams overlay one another. When two beams are overlapped, they can be treated identically for imaging purposes. For example, comparing the surface diagram for surface E of FIG. 5 with the surface E diagram of FIG. 6, it can be seen that beam path overlap of the forward propagating and reverse propagating beams initially occurs at surface E so as to be present in layer 110 and subsequent layers 112 and 114. Moreover, it is further recognized that polarization mixing of two different light beams can readily be accomplished once beam path overlap has been achieved. In the present example, beam path overlap occurs simultaneous with polarization mixing. However, in at least one example yet to be described, beam path overlap of the forward and reverse traveling beams occurs prior to polarization mixing.

Attention is once again directed to FIGS. 3 and 4 in consideration of the advantages of the present invention. In this regard, the reader is reminded that device 30 of FIG. 3 is not linearly expandable due to the orthogonal arrangement of the interface surfaces defined by first and second birefringent crystal pairs 34 and 36, respectively. In contrast, circulator 100 (FIG. 4) of the present invention is linearly expandable by elongation of the device in the direction defined between ports 1 and 3. In this way, additional three port circulators may be formed and/or higher port count circulators may be formed. The present invention contemplates at least a 4 port circulator manufactured in accordance with the teachings herein. Moreover, the present invention enjoys the additional advantage that the device may be manufactured in a compact form since the need for external focusing lenses has been eliminated.

Referring to FIGS. 1 and 4, it is possible to compare the relative merits of these designs regarding the separation of the beam components from interface surfaces by evaluating the optical propagation distance traveled by the beam component vs. the distance from the center of the component to the nearest interface. In the FIG. 1 device disclosed by U.S. Pat. No. 5,574,596, each component must travel through crystals with an overall length of 1.414X while, at the same time, each component ends up a distance of 0.353 d from the interface. Therefore, we might represent the figure of merit for this device as far as beam-interface separation goes as 1.414X/0.353d or 4X/d. It is noted that lower relative values of this figure of merit are indicative of desirable designs. In FIG. 4 for circulator 100 of the present invention, the corresponding figure of merit is about 2X/d for a forward going beam and 4X/d for a reverse traveling beam, if one assumes that d equals 250 microns and accounts for the non-reciprocal rotation layer as follows. A crystal of rutile long enough to translate a beam component 250 microns (X) would be roughly 2.5 mm long (d). Rutile has an index of refraction of approximately 2.5. A non-reciprocal polarization crystal composed of gadolinium garnet e.g. sufficiently long to make a polarization rotation of 45 degrees for 1.5 micron radiation would be approximately 0.5 mm thick and would have an index of about 2.0. Therefore, the amount of beam expansion which would occur in this gadolinium garnet crystal is equivalent to the amount which would occur in a layer of rutile 0.5(2.5/2.0)=0.625 mm thick. The equivalent thickness in terms of X is therefore determined by the ratio of 0.625 mm to the overall length 2.5 mm (from above) required for a 250 micron translation or 0.625/2.5=0.25d. In the device of FIG. 4, the beam components must travel forward through layers with a total equivalent thickness of 1.957X and would then be located a distance d from the interface. Thus, a figure of merit of approximately 2.0X/d is achieved in the forward direction. Beams that are traveling in the reverse direction, when they arrive at the same surface in the circulator, are located a distance of 0.5d from the interface. Therefore, the figure of merit for circulator 100 of the present invention is improved in the forward direction by a factor of two, as compared with the prior art device of FIG. 1. Moreover, the aforementioned manufacturing advantages remain attendant to the design.

Figure 7:
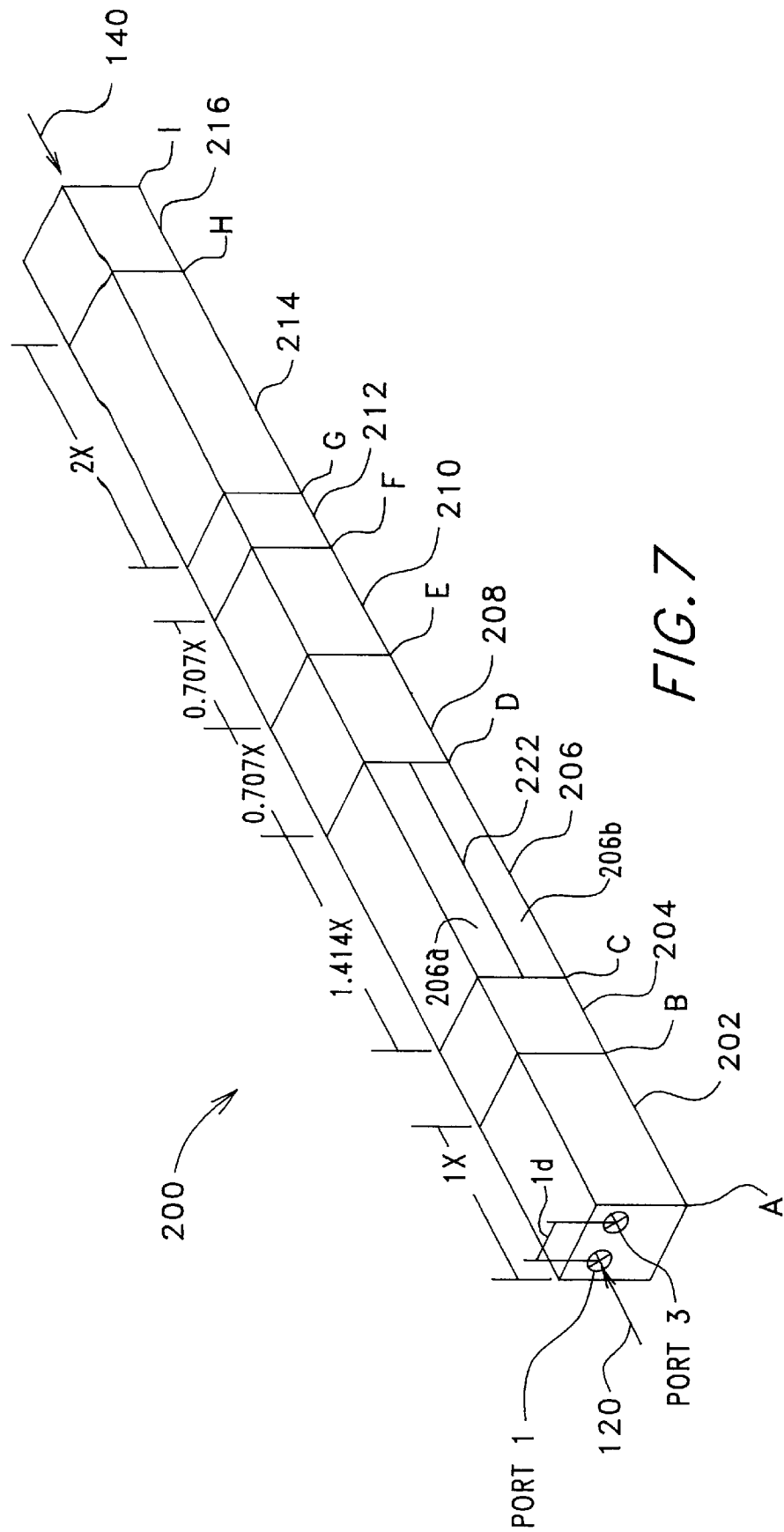
FIG. 7 is a diagrammatic perspective view of a second optical device manufactured in accordance with the present invention, shown here to illustrate the overall structure of the device.

Turning now to FIG. 7 which illustrates a second optical device manufactured in accordance with the present invention and generally indicated by the reference numeral 200. In the present example, optical device 200 comprises an optical circulator and will be referred to as such hereinafter. Like previously described circulator 100, circulator 200 incorporates a series of stacked optical elements in the form of substrates defining parallel planar surfaces. Specifically, the circulator is comprised of a series of eight layers indicated by the reference numbers 202, 204, 206, 208, 210, 212, 214 and 216. The visible end surface of the circulator is designated by the letter "A" while the opposite end of the circulator is designated by the letter "I". Intermediate surfaces which are disposed between surfaces A and I are designated by the letters B through H. The layers may be manufactured from materials described in the foregoing discussions with regard to circulator 100 and from other materials found to be suitable so long as the requisite function associated with each layer is maintained.

Referring to FIG. 8 in conjunction with FIG. 7, surface A of layer 202 defines port 1 and port 3 of the circulator while Port 2 is defined by surface I of layer 216 at the opposite end of the circulator. Again, this latter port is not visible in the present Figure. As is the case with circulator 100, the eight layers which make up circulator 200 include both polarization rotation layers and birefringent layers. The thicknesses of birefringent layers are again indicated in the Figure in terms of the quantity "X" which is established by the walk-off characteristics of the material which is used to form the walk-off layers while ports 1 and 3 are separated by distance "d" such that a walk-off of d is provided over a length X of the walk-off material for the correct light polarization. Each of surfaces A through I is diagrammatically illustrated including the polarization orientation of orthogonal components of light beam 120 that is received by port 1 traveling in a forward direction consistent with the direction of the arrow used to denote the light beam. Between each of the depicted surface diagrams, function diagrams F202, F204, F206, F208, F210, F212 and F214 correspond to the reference numbers of the seven device layers and diagrammatically illustrate the functional step performed within the associated layer. No function diagram is associated with layer 216 since this layer comprises a phase delay compensation layer that preferably has no influence upon polarization component orientation or location. Again, walk-off directions are indicated in the function diagrams of FIG. 8 using arrows and always looking in the direction of travel of beam 120 such that a polarization orientation which is parallel to the walk-off direction will experience the walk-off. At this point, it is appropriate to note that a walk-off material having a 1X thickness will move the appropriate polarization component, for example, vertically or horizontally by two grid positions within the matrix of illustrated positions in each of the surface diagrams of FIG. 5. Thus, the grid spacing in FIG. 8 and in FIG. 9, to be described, is equal to (0.5)d.

Continuing with a description of circulator 200 taking reference to FIGS. 7 and 8, in layer 202, component 120*a* of beam 120 is walked downward by 1d, as shown in F202, prior to its arrival at surface B. The polarization components then enter layer 204 which comprises a polarization rotation layer that rotates components 120 counter clockwise by 45 degrees prior to the components arriving at surface C. Thereafter, layer 206 is entered wherein polarization component 120*a* enters layer 206*b* and polarization component 120*b* enters layer 206*a*. In accordance with the present invention, layer 206, similar to previously described layer 106, includes first and second birefringent crystals 206*a* and 206*b*. These latter birefringent crystals define an interface surface 222 (appearing as a line in F206 and in FIG. 7) which lies parallel to the direction of travel of light beam 120. Crystals 206*a* and 206*b* include walk-off directions 224*a* and 224*b*, respectively, oriented as shown in F206. Specifically, walk off directions 224*a* and 224*b* are orthogonal with respect to one another such that each walk-off direction forms approximately a 45° angle with interface surface 222. Therefore, in accordance with the present invention, polarization components 120*a* and 120*b* are simultaneously moved away from one another and from interface surface 222 while also being moved in a direction that is parallel to interface surface 222 in the manner described above with reference to layer 106 of FIG. 4. The advantages in moving the polarization components away from the interface surface have been described above with regard to circulator 100 of FIG. 4. In this regard, it should be appreciated that circulator 200 shares all of these advantages.

Still describing the travel of light beam 120 in the forward direction in circulator 200, light polarization components 120*a* and 120*b* next enter layer 208 which comprises a walk-off layer that moves component 120*b* by 0.707d (i.e., diagonally by one grid position) as indicated by an arrow 226 in F208. Thereafter, layer 210 provides an additional 0.707d diagonal walk-off in the direction indicated by an arrow 228 (orthogonal to arrow 226) in F210 such that the polarization components are vertically aligned upon arrival at surface F. Layer 212 then provides a 45 degree non-reciprocal polarization rotation in a counter clockwise direction as indicated by F212. The polarization components then enter walk-off layer 214 which walks component 120*b* downward by 2d (see function diagram F214) such that component 120*a* overlies component 120*b*. Both polarization components then pass through phase compensation layer 216 which serves in the manner described above to establish a proper phase relationship between the two components upon arrival of the components at port 2 on surface I.

Turning to FIGS. 7 and 9, a description will now be provided of the travel of light beam 140 through circulator 200 after entering port 2 in the reverse direction. In the manner of FIG. 6, FIG. 9, includes function diagrams designated using the appropriate reference number of an associated layer prefixed with the letter "R". The reader is reminded that all illustrations in FIG. 9 assume the same viewpoint as those of FIG. 8. That is, looking in the forward direction. Moreover, FIG. 9 is consistent with FIG. 8 in that a walk-off material having a 1X thickness will move the appropriate polarization component, for example, either vertically or horizontally by two grid positions (i.e., by distance d) within the matrix of illustrated positions in each of the surface diagrams of FIG. 9. After entering phase delay compensation layer 216 at port 2, as defined on surface I, beam 140 arrives at surface H in the same locations since the phase delay compensation layer has no discernible influence on the beam positions Thereafter, the polarization components enter walk-off layer 214 which provides a 2d walk in an upward direction indicated by an arrow 230 in function diagram R214 for polarization component 140*a*.

After passing through layer 214, light polarization components 140*a* and 140*b* arrive at surface G whereby to enter non-reciprocal polarization rotation layer 212 which rotates polarization components 140*a* and 140*b* by 45 degrees in a counter clockwise direction as shown in R112 prior to the components arriving at surface F. Thereafter, layer 210 provides a 0.707d diagonal walk-off in the direction indicated by an arrow 232 in R210. Light polarization components 140*a* and 140*b* next enter layer 208 which walks component 140*b* by 0.707d (i.e., diagonally upward and to the right by one grid position) as indicated by an arrow 234 (orthogonal to arrow 232) in R208. Next, layer 206 is entered wherein polarization component 140*a* enters crystal 206*a* and polarization component 140*b* enters layer crystal 206*b*. The orthogonal walk-off directions of crystals 206*a* and 206*b* are indicated by the reference numbers 236*a* and 236*b*, respectively, for the reverse direction. Of course, these directions oppose the corresponding forward directions shown in F206 of FIG. 7 and form approximately a 45° angle with interface surface 222. However, it can be seen that in both crystals 206*a* and 206*b*, the polarization orientation of the light component passing therethrough is orthogonal to the crystal's walk-off direction. Therefore, the components arrive unaffected at surface C. In layer 204, the polarization components experience a counter clockwise 45 degree rotation (R204) prior to arriving at surface B such that component 140*a* is horizontally oriented and component 140*b* is vertically oriented. In layer 202, component 140*b* of beam 140 is walked upward by 1d, as shown in R202, prior to its arrival at surface B such that the components overlie one another upon arriving at port 3 defined on surface A.

Referring to FIGS. 8 and 9, it is noted that beam path overlap of the forward and reverse traveling beams, as defined above, occurs initially at surface D and is present in all subsequent layers. That is, overlap is present in layers 208, 210, 212, 214 and 216. However, in the present example, polarization mixing does not occur until surface F.

Figure 10:
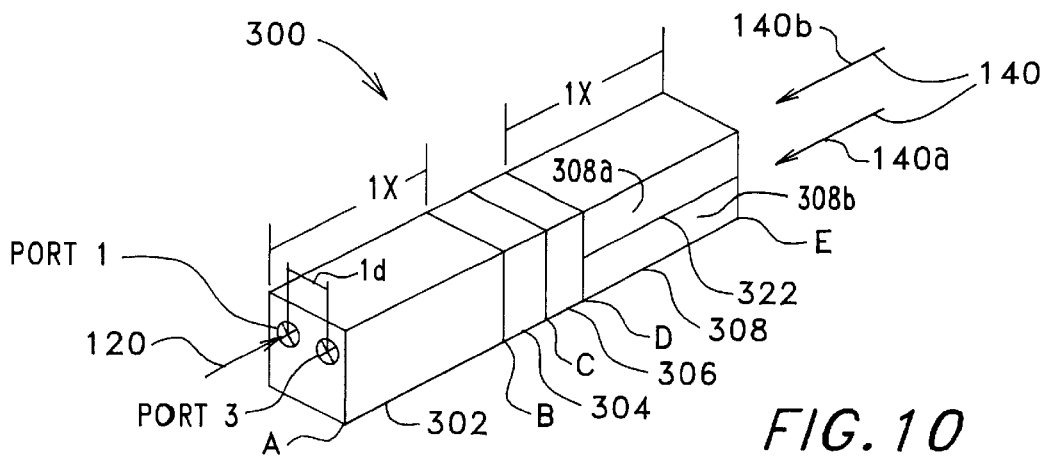
FIG. 10 is a diagrammatic perspective view of an alternative polarization mixing arrangement shown here to illustrate details of its construction.

Attention is now directed to FIG. 10 which diagrammatically illustrates an alternative polarization mixing arrangement 300. Arrangement 300 is useful in any application wherein it is desired to produce polarization mixing using light polarization components which are obtained from two different light paths. For purposes of clarity, mixing arrangement 300 will be described in terms of a three port optical circulator. However, it is to be understood that its use is not limited to that application. Arrangement 300 includes a series of stacked optical elements in the form of substrates defining parallel planar surfaces. Specifically, the circulator is comprised of a series of four layers indicated by the reference numbers 302, 304, 306 and 308. The visible end surface of mixing arrangement 300 is indicated by the letter "A" while the opposite end of the mixing arrangement is designated by the letter "E". Intermediate surfaces which are disposed between surfaces A and E are designated by the letters B through D. The layers may be manufactured from materials described in the foregoing discussions with regard to circulators 100 and 200 and from other materials found to be suitable so long as the requisite function associated with each layer is maintained.

Figure 11:
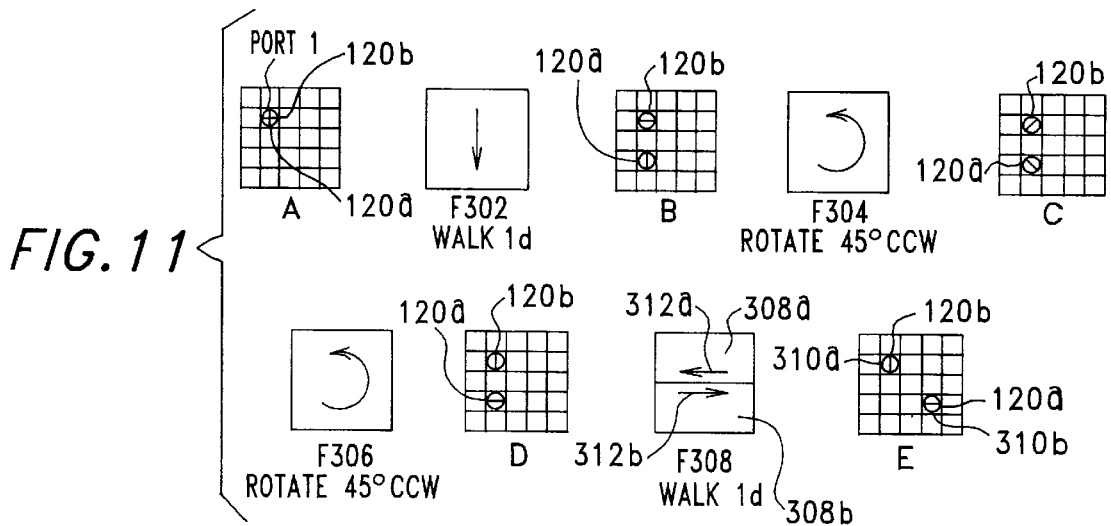
FIG. 11 is a diagrammatic illustration showing interface surfaces adjoining the four layers which make up the alternative polarization mixing arrangement of FIG. 10 indicating the orientations of orthogonal polarization components of a forward traveling light beam and also showing function diagrams depicting walk-off and rotation functions performed by each layer on the forward traveling light beam.
Figure 12:
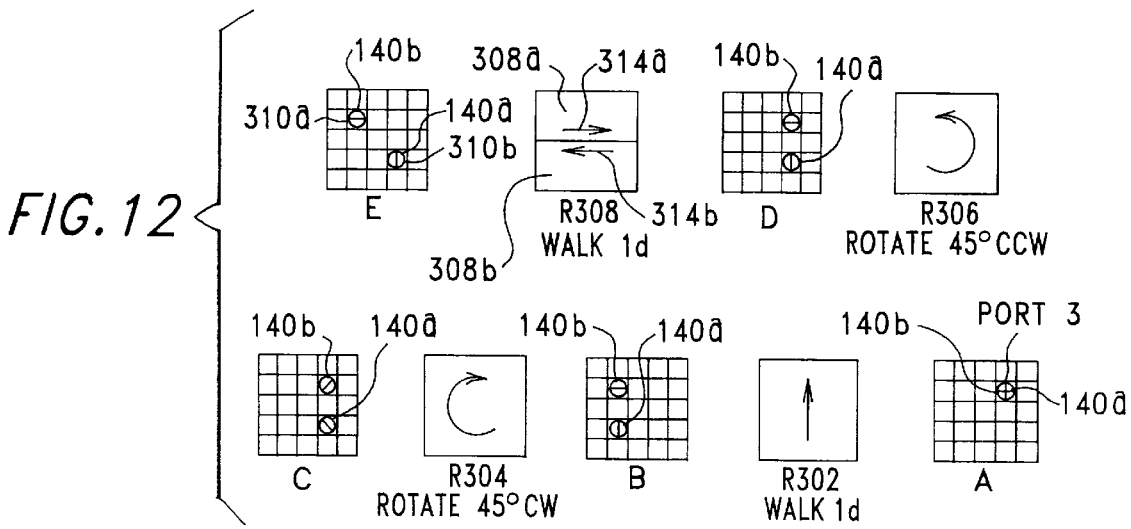
FIG. 12 is a diagrammatic illustration again showing interface surfaces adjoining the four layers which make up the alternative polarization mixing arrangement of FIG. 10, but now showing the surfaces indicating the orientations of orthogonal polarization components of a reverse traveling light beam and also showing function diagrams depicting walk-off and rotation functions performed by each layer on the reverse traveling light beam.

Referring collectively to FIGS. 10–12, it is noted that the conventions used above with regard to depicting the travel of orthogonal light beam polarization components have been adopted once again in FIGS. 11 and 12. For example, views in the surface and function diagrams continue to be taken in the direction consistent with forward traveling beam 120. It should also be noted that polarization mixing, in terms of optical circulation, requires defining ports 1 and 3 separated by distance d on surface A such that light signal 120 may enter port 1 in the forward direction to ultimately be resolved into orthogonal polarization components at grid locations 310a and 310b of surface E, respectively, as shown. In the reverse direction, light signal 140 is resolved, for example, by an appropriately configured set of stacked planar crystals (not shown) into orthogonal polarization components 140a and 140b such that component 140a enters grid location 310b and component 140b enters grid location 310a on surface E. Thus, the forward and reverse traveling light beams are polarization mixed at surface E. Specific details will be provided immediately hereinafter with regard to passage of the polarization components of the light beams through mixing arrangement 300 in both the forward and reverse directions.

Still referring to FIGS. 10–12, as mentioned, light beam 120 enters port 1 on surface A of layer 302. The four layers which make up mixing arrangement 300 include both polarization rotation layers and birefringent layers. The thicknesses of birefringent layers are again indicated in the Figure in terms of the quantity "X" which is established by the walk-off characteristics of the material which is used to form the walk-off layers in view of distance d such that a walk-off of d is provided over a length X of the walk-off material for the correct light polarization. Function diagrams F302, F304, F306 and F308 correspond to the reference numbers of the four device layers. A walk-off material having a 1X thickness will move the appropriate polarization component either vertically or horizontally by two grid positions within the matrix of illustrated positions in each of the surface diagrams of FIGS. 11 and 12. Thus, the grid spacing in these Figures is equal to (0.5)d.

Continuing with a description of polarization mixing arrangement 300 with reference to Figures, layer 302 comprises a walk-off layer having a walk-off direction oriented so as to walk polarization component 120a in a downward direction by 1d (see F302) as polarization components 120a and 120b pass through the layer. At surface B, the polarization components enter layer 304 which comprises a reciprocal polarization rotation layer formed, for example, from quartz or rutile or other such suitable materials. As shown in function diagram F304, layer 304 rotates forward traveling polarization components 120a and 120b counter clockwise by approximately 45 degrees prior to their arrival at surface C. Thereafter, the polarization components immediately enter layer 306 which is a non-reciprocal polarization rotation layer configured for rotating polarization components 120a and 120b by approximately 45 degrees in a counter clockwise direction as indicated in function diagram F306. Upon arrival at surface D, polarization component 120b is vertically oriented and positioned by 1d directly above polarization component 120a which is itself horizontally oriented. Layer 308 includes first and second walk-off crystals 308a and 308b having walk-off directions 312a and 312b, respectively. In this latter layer, polarization component 120a is walked horizontally to the right by 1d while component 120b does not experience a walk-off since its orientation is perpendicular to walk-off direction 312a. Thus, upon arriving at surface E, polarization component 120a is at grid position 310b while polarization component 120b is at grid position 310a.

Referring primarily to FIGS. 10 and 12, considering the reverse direction of travel of light beam 140 in polarization mixing arrangement 300, polarization component 140a (having a vertical orientation) enters grid location 310b while polarization component 140b (having a horizontal orientation) enters grid location 310a. In layer 308, for light travel in the reverse direction, walk-off directions of walk-off crystals 308a and 308b are indicated by the reference numbers 314a and 314b in function diagram R308, respectively, which are opposite the walk-off directions for the forward traveling direction (see F308). Therefore, polarization component 140b is walked horizontally to the right by 1d while component 140a does not experience a walk-off since its orientation is perpendicular to walk-off direction 314b such that the two polarization components are vertically aligned upon arrival at surface D. The polarization components then enter non-reciprocal polarization rotation layer 306 which rotates both polarization components by approximately 45 degrees in a counter clockwise direction as indicated in function diagram R306. However, in reciprocal polarization rotation layer 304, both polarization components are rotated by approximately 45 degrees in a clockwise direction per function diagram R304 such that polarization component 140a is in a vertical orientation while polarization component 140b is in a horizontal orientation. Thereafter, in walk-off layer 302, polarization component 140a is walked upward by 1d such that components 140a and 140b overlap one another at port 3.

Figure 13:
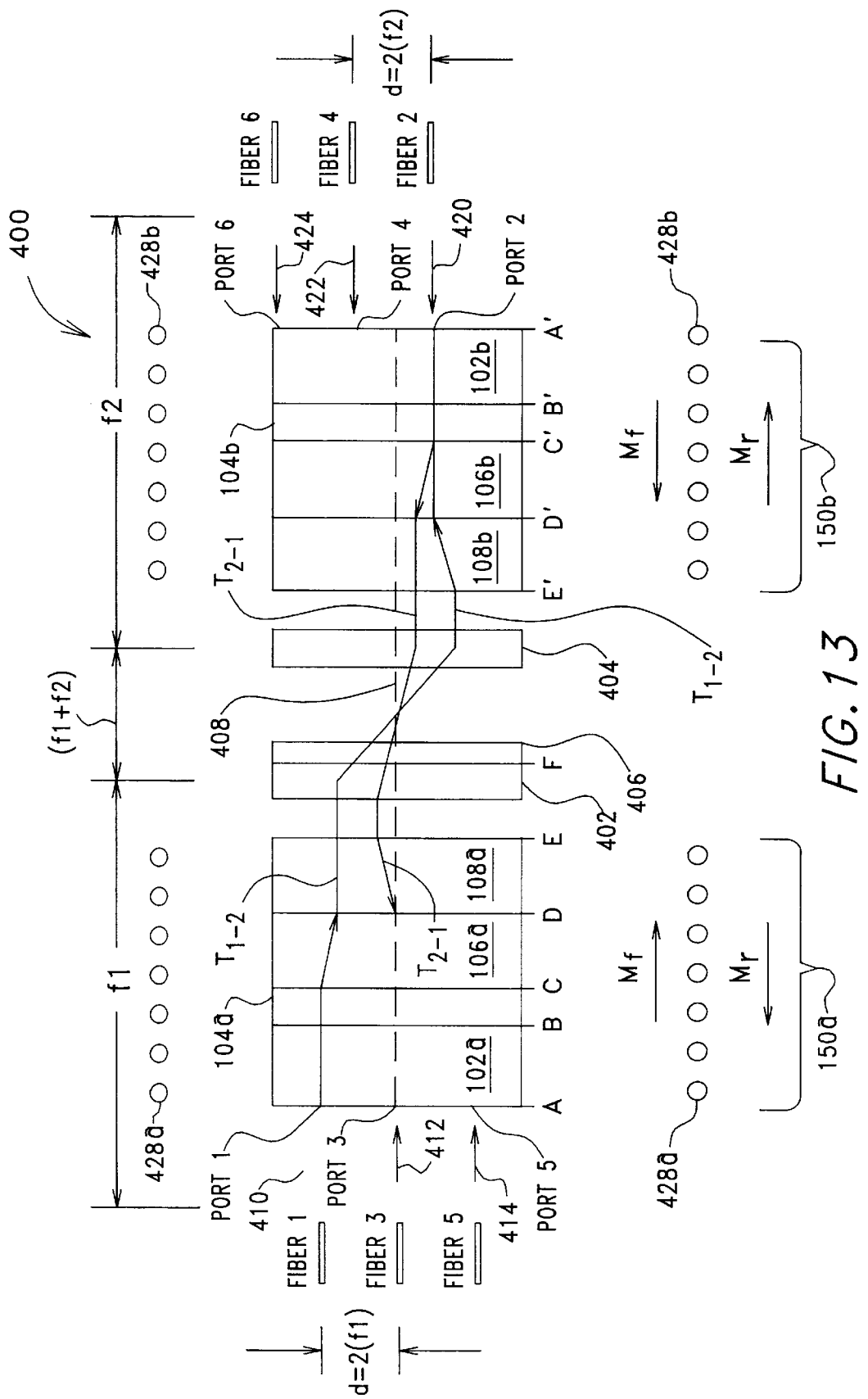
FIG. 13 is a diagrammatic view of a third optical device manufactured in accordance with the present invention, shown here to illustrate the overall structure of the device.

Attention is now directed to FIG. 13 which illustrates a third optical device manufactured in accordance with the present invention and generally indicated by the reference number 400. In this instance, device 400 comprises an optical circulator having six ports and will be referred to hereinafter as circulator 400. Circulator 400 provides optical circulation between ports 1–6 which are aligned with optical fibers designated as fibers 1–6. The circulator includes polarization mixing arrangements 150a and 150b. These polarization mixing arrangements are essentially identical to previously described polarization mixing arrangement 150. However, it should be understood that the overall dimensions of arrangements 150a and 150b may be varied, as compared with previously described arrangement 150, in order to suit the present application. Arrangement 150a includes layers 102a, 104a, 106a and 108a while the layers of polarization mixing arrangement 150b all carry the same numerical designation appended with a "b". All of the layers of arrangements 150a and 150b are functionally identical with those in arrangement 150. Surfaces in polarization mixing arrangement 150a are designated by the letters A–E while surfaces in arrangement 150b are designated by the letters A'–E'. In this optical device implementation and in the one immediately following, the components may be supported in the illustrated configuration in any suitable manner. As an example, the components may be mounted in a cylindrical housing.

Still referring to FIG. 13, polarization mixing arrangements 150a and 150b are arranged in an aligned manner forming part of circulator 400 such that surface E of arrangement 150a is facing, but spaced apart from surface E' of arrangement 150b at a predetermined distance therefrom, as will be described further. Components positioned between the two polarization mixing arrangements 150a and 150b include first and second lenses 402 and 404, respectively. In the present example, gradient radial index (hereinafter GRIN) lenses have been selected for use as lenses 402 and 404. However, it should be appreciated any suitable type of lens may be utilized such as, for example, molded aspheres or ground spherical lenses. Lens 402 includes a focal length f1 while lens 404 includes a focal length f2. For illustrative purposes, f1 is equal to f2 in the present example. Certain dimensions within circulator 400 are established by the focal lengths of the lenses. In particular, the input faces of fibers 1, 3 and 5 are positioned at focal length f1 from lens 402 with the center line of both lenses being indicated by a line 408. At the opposite end of the circulator, the input faces of fibers 2, 4 and 6 are positioned at focal length f2 from lens 404. Lenses 402 and 404 are separated by the sum of focal lengths f1 and f2. Fibers 1, 3 and 5 are separated from one another by a distance d as determined by the crystal elements and their walkoffs. Fibers 2, 4 and 6 are separated from one another by a distance of f2/f1(d). The walkoffs of the elements of mixing arrangement 150b must be adjusted as compared to mixing arrangement 150a consistent with this magnification factor. Fiber 3 is positioned directly above the center line of the lenses. At the opposing end of the circulator, fiber 2 is centered in the plane of the figure between fibers 3 and 5. Moreover, it is important to note that the dimensions in FIG. 13 have been significantly exaggerated for illustrative purposes. For example, the thicknesses of the layers which make up polarization mixing arrangements 150a and 150b have been greatly exaggerated. As mentioned above, these layers are typically very thin. Additionally, the sum of f1 and f2 is not to scale with respect to these dimensions as individually depicted in the Figure. Likewise, the separation between adjacent fibers as determined by f1 or f2 is not to scale. A half wave plate 406 is shown positioned between lenses 402 and 404 immediately adjacent lens 402. It is noted that half wave plate 406 may be located at any position between the two polarization mixing arrangements. However, it is preferred that the half wave plate is not positioned so that it is one focal distance from either of the lenses. Half wave plate 406 may be formed from any suitable birefringent material such as, for example, quartz.

Figure 14:
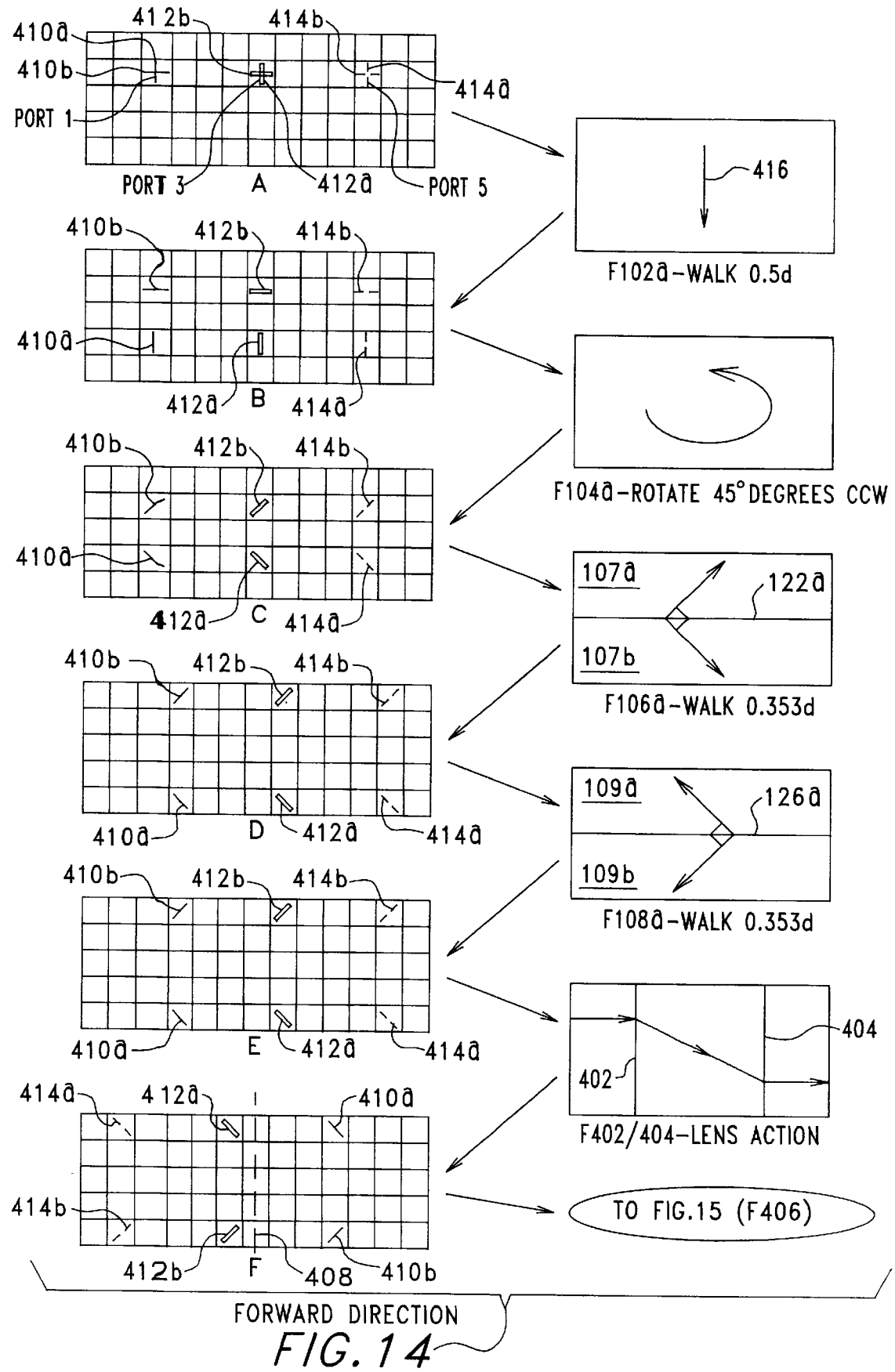
FIG. 14 is a diagrammatic illustration showing surface diagrams at positions along the path of light travel of the device of FIG. 13 indicating the orientations of orthogonal polarization components of forward traveling light beams and also showing function diagrams depicting walk-off and rotation functions performed by each component of the device on the forward traveling light beams.

Turning to FIG. 14 in conjunction with FIG. 13, travel of light will now be described in a forward direction from port 1 to port 2, port 3 to port 4 and from port 5 to port 6. As in previous illustrations, surface diagrams representing the state of light polarization components at various surfaces or planes in the device will be utilized along with function diagrams being used to represent the specific operations performed within the layers defined between the surfaces. However, with regard to lenses 402 and 406 it is noted that the effects of the lenses will be lumped. Moreover, it should be appreciated that light polarization components passing between lenses 402 and 404 are in a defocused state. Therefore, even though half wave plate 406 operates on light components as they pass between the two lenses, the specific function accomplished by the half wave plate will be described apart from the lumped function attributable to the combination of lenses 402 and 404. The thicknesses of birefringent layers are again established in terms of the quantity "X" (not shown) which is established by the walk-off characteristics of the material that is used to form the walk-off layers in view of the fiber separation. In this instance, the fiber separation is equal to d for polarization mixing arrangement 150a and equal to f2/f1(d) for polarization mixing arrangement 150b such that a walk-off of d or f2/f1(d), is provided over a length X of a length f2/f1(X), respectively, of the walk-off material for the correct light polarization. Since the present example assumes that f1 is equal to f2, the fiber spacing will be considered as being equal to the value d for both mixing arrangements. Thus, a walk-off material having a 1X thickness will move the appropriate polarization component either vertically or horizontally by d or four grid positions within the matrix of illustrated positions in the appropriate surface diagrams of the Figure such that the grid spacing in this Figure and in FIG. 15, to be described, is equal to (0.25)d. The thickness of layers 102a,b is 0.50X and the thickness of layers 106a,b and 108a,b is 0.353X.

Still referring to FIGS. 13 and 14, light beams 410, 412 and 414 enter ports 1, 3 and 5, respectively. The light beams include a first polarization component denoted by appending the letter "a" to the appropriate reference number and a second, orthogonally oriented polarization component denoted by appending the letter "b" to the appropriate reference number. In order to further aid the reader's understanding, travel of light beam 410 from port 1 to port 2 is illustrated by light path $T_{1-2}$ in the "overhead" view provided by FIG. 13. Beginning at surface diagram A in FIG. 14, as the light beams pass through layer F102a, light polarization components 410a, 412a and 414a are walked by 0.5d in the direction indicated by an arrow 416 in function diagram F102a prior to arriving at surface B. Then, in layer 104a, the polarization components of all three forward traveling beams are rotated counterclockwise in the amount of approximately 45° by non-reciprocal Faraday layer F104a prior to arrival of the beams at surface C, as seen in F104a. In function diagram F106a, it can be seen that the orthogonal walk-off directions defined by layers 107a and 107b, as described above, are aligned with the polarization components of beams 410, 412 and 414. Therefore, the polarization components experience orthogonal walk-offs in layer 106a of 0.353d (one diagonal grid position) so as to move the beams away from and, at the same time, parallel to interface surface 122a. Up to this point in the forward travel of beam 410, the $T_{1-2}$ path in FIG. 13 appears as a straight line, however, the "horizontal" component of the walk-off in layer 106a is shown by $T_{1-2}$. In layer 108a, the polarization components do not experience walk-off since the components are orthogonal to the walk-off directions in crystals 109a and 109b as may be observed by comparison of surface diagram D with function diagram F108a.

The polarization components then exit from polarization mixing arrangement 150a and enter lens 402. Path $T_{1-2}$ for beam 410 illustrates the effects of lenses 402 and 404 while function diagram F402/404 illustrates the aforementioned lumped effect provided for all three beams by the cooperation of lenses 402 and 404. In this regard, the lumped effect is illustrated in surface diagram F even though the total effect is not accomplished until the light polarization components have passed through both lenses, as will be appreciated by one having ordinary skill in the art. More particularly, a mirror image of the polarization components is produced, amounting to an exchange of positions in the grid with respect to the center line of the lenses, as revealed by comparison of surface diagrams E and F in FIG. 14.

Attention is now directed to FIG. 15 in conjunction with FIG. 13. As previously mentioned, even though half wave plate 406 is positioned between lenses 402 and 404 its effect is illustrated separately in function diagram F406 wherein it can be seen that the half wave plate provides a 90° phase rotation of the light polarization components of all three beams traveling in the forward direction. Thereafter, the beams enter polarization mixing arrangement 150b at surface E'. In layer 108b, the orthogonal polarization components of all three forward traveling beams are walked orthogonally towards and along interface surface 126a by 0.353d (i.e., one diagonal grid position) as illustrated by function diagram F108b and by path $T_{1-2}$ for beam 410 prior to arrival of the components at the positions indicated in surface diagram D'. Due to the orthogonal relationship between the polarization orientation of the light components and the walk-off directions of crystals 107a and 107b which make up layer 106b, the light polarization components do not experience walk-off in layer 106b, as shown by function diagram F106b and path $T_{1-2}$.

Still referring to FIGS. 13 and 15, polarization rotation layer 104b provides a non-reciprocal rotation of 45° in a clockwise direction which places the polarization orientations of all three beams into horizontal and vertical orientations. In this regard, it should be appreciated that the polarization rotation direction implemented by layer 104b is consistent with the direction provided by layer 104a when one remembers that the view taken in function diagram F104b is in the forward direction and that the magnetic field direction for layer 104b is reversed from its direction in layer 104a. Thereafter, in layer 102b, vertically oriented polarization components 410a, 412a and 414a are walked upward by 0.5d so as to overlap their respective horizontally oriented polarization components 410b, 412b and 414b. Thus, it can be seen in surface diagram A' that beam 410 has arrived at port 2, beam 412 has arrived at port 4 and beam 414 has arrived at port 6.

Figure 16:
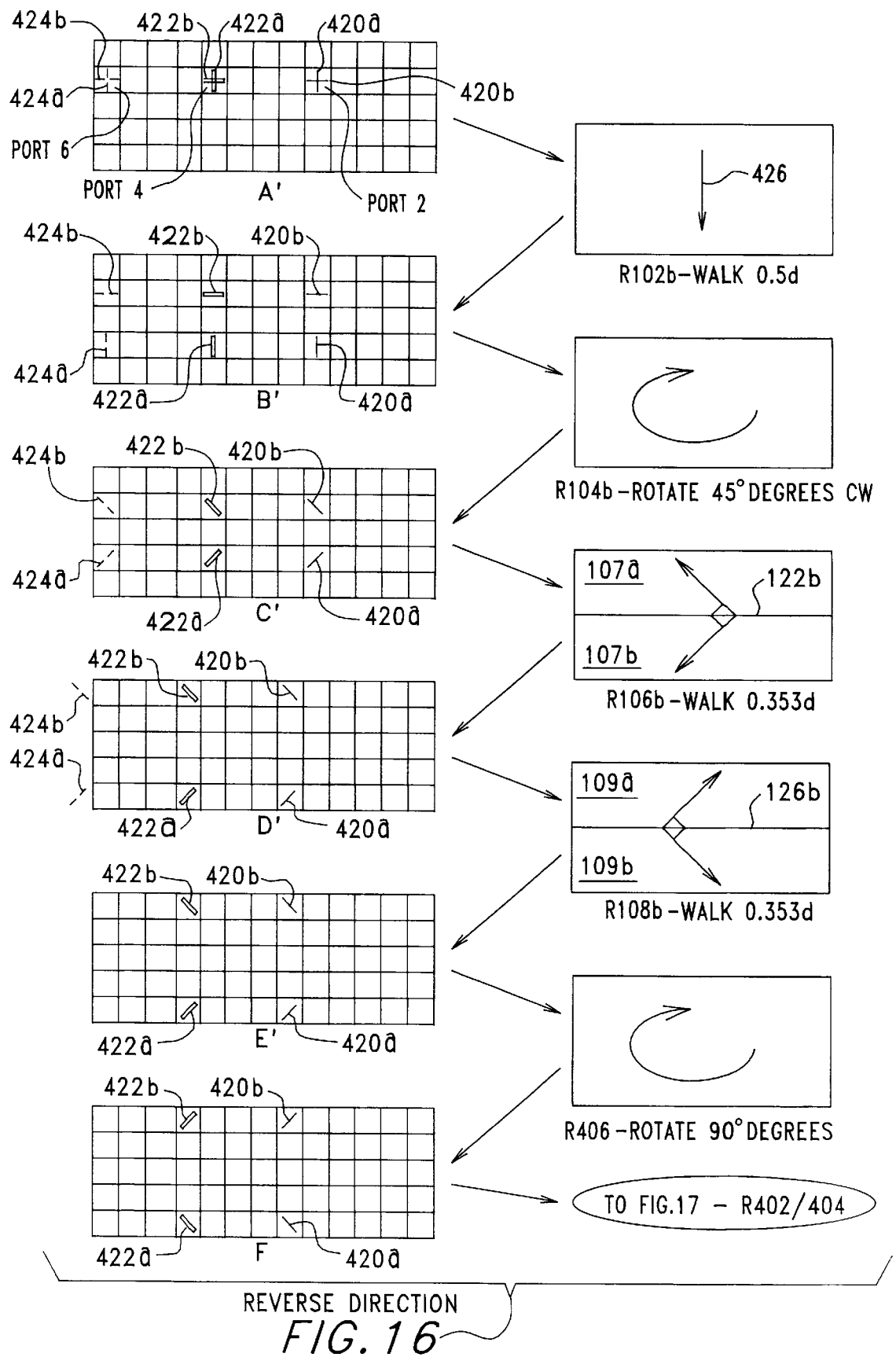
FIG. 16 is a diagrammatic illustration showing surface diagrams at positions along the path of light travel of the device of FIG. 13 indicating the orientations of orthogonal polarization components of reverse traveling light beams and also showing function diagrams depicting walk-off and rotation functions performed by each component of the device on the reverse traveling light beams.
Figure 17:
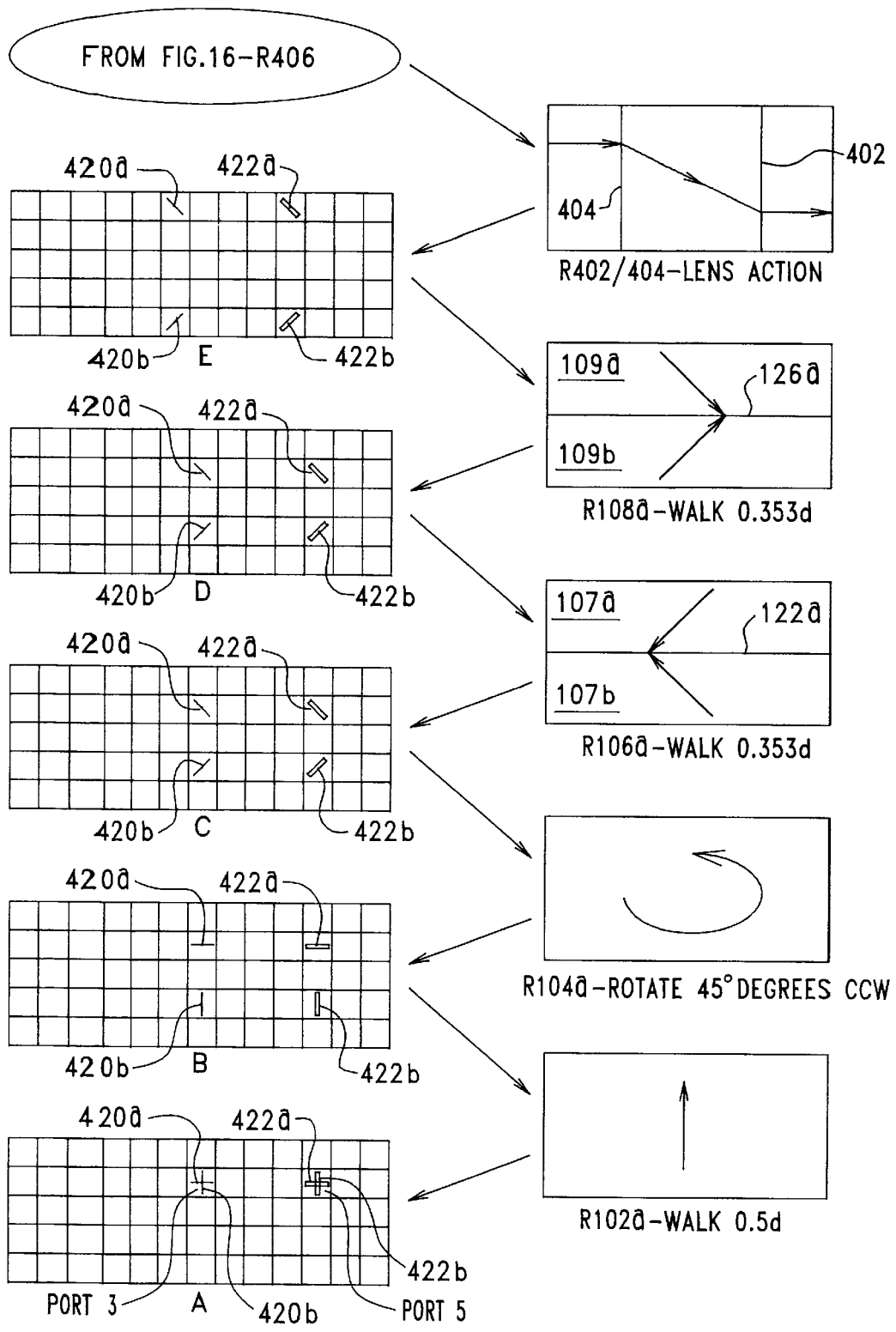
FIG. 17 is a diagrammatic illustration continuing from FIG. 16 showing surface diagrams at positions not shown in FIG. 16 along with the orientations of the reverse traveling beams at those surfaces.

Referring now to FIGS. 13 and 16, having described the travel of light beams in the forward direction through circulator 400, travel of other light beams in the reverse direction will now be described. To that end, light beams 420, 422 and 424 are illustrated in FIG. 13 entering ports 2, 4 and 6, respectively, in the reverse direction of travel. Travel of these light beams will be described in the reverse direction from port 2 to port 3 (beam 420) and from port 4 to port 5 (beam 422). At the same time, it will be illustrated that beam 424 entering port 6 is rejected by circulator 400, since the circulator does not include a port 7. However, it should be appreciated that port 7 may be provided by lateral extension of the dimensions of the circulator. Surface diagrams corresponding to those used in FIGS. 14 and 15 will be employed along with associated function diagrams. The function diagrams in FIG. 16 and, subsequently, in FIG. 17 are designated using the appropriate reference number prefixed by the letter "R" indicative of the reverse direction. Again, the viewpoint taken in all of these diagrams is that of looking in the forward direction. The effects of lenses 402 and 406 will again be lumped with the effect of half-wave plate being considered separately.

Still referring to FIGS. 13 and 16, light beams 420, 422 and 424 include a first polarization component denoted by appending the letter "a" to the appropriate reference number and an orthogonal, second polarization component denoted by appending the letter "b" to the appropriate reference number. As an expedient to understanding, travel of light beam 420 from port 2 to port 3 is illustrated by light path $T_{2-1}$ in the "overhead" view provided by FIG. 13. Beginning at surface diagram A' in FIG. 16, as the light beams pass through layer F102b, light polarization components 420a, 422a and 424a are walked in the direction indicated by an arrow 426 by 0.5d in function diagram R102b prior to arriving at surface B'. Then, the polarization components of all three reverse traveling beams are rotated clockwise (looking in the forward direction) in the amount of approximately 45° by non-reciprocal Faraday layer 104b prior to arrival of the beams at surface C, as seen in R104b. In accordance with function diagram R106b, the orthogonal walk-off directions defined by crystals 107a and 107b of layer 106b are aligned with the polarization components of beams 420, 422 and 424. Therefore, the polarization components experience orthogonal walk-offs in layer 106b, the horizontal component of which is illustrated by path $T_{2-1}$ for beam 420, so as to move the beams away from and, at the same time, parallel to interface surface 126a. During this walk-off, polarization components 424a and 424b are laterally walked out of the circulator body in such a way that beam 424 is rejected. For this reason, the components of beam 424 are illustrated in surface diagram D' outside of the circulator body. In view of the rejection of beam 424, this latter beam is not present in the remaining diagrams relating to beam travel in the reverse direction. The polarization components do not experience walk-off in layer 108b since the components are in orthogonal polarization orientations to the walk-off directions in crystals 109a and 109b, as may be observed by comparison of surface diagram C' with function diagram R108b.

Turning to FIGS. 13, 16 and 17, the polarization components then exit from polarization mixing arrangement 150b to enter lens 404, pass through half-wave plate 406 and then through lens 402. Light path $T_{2-1}$ illustrates the travel of beam 420 through the lenses. For purposes of clarity, the effect of the half-wave plate and the lumped effect of the lens will be described in reverse order relative to the description for the forward direction. Therefore, from surface E' to surface F, the effect of the half-wave plate is illustrated by function diagram R406 providing a 90 degree phase rotation of the beam 420 and 422 polarization components. Thereafter, in FIG. 17, function diagram R402/404 illustrates the lumped effect provided by the cooperation of lenses 402/404 such that a mirror image of the light polarization components is produced relative to center line 408 of the lenses. Once again, even though half wave plate 406 is positioned between lenses 402 and 404 its effect is illustrated separately in function diagram F406 wherein it can be seen that the half wave plate provides a 90° phase rotation to the light polarization components of all three beams traveling in the forward direction.

Thereafter, the beams enter polarization mixing arrangement 150a at surface E. In layer 108a, the orthogonal polarization components of all three forward traveling beams are walked orthogonally towards and parallel with interface surface 126a by 0.353d (i.e., one diagonal grid position) as illustrated by function diagram R108a prior to arrival of the components at the positions indicated in surface diagram D'. The horizontal component of this walk is evidenced by path $T_{2-1}$ for beam 420. Due to the orthogonal relationship between the polarization orientation of the light components and the walk-off directions of crystals 107a and 107b which make up layer 106a, the light polarization components do not experience walk-off in layer 106a.

Referring to FIGS. 13 and 17, polarization rotation layer 104a provides a non-reciprocal rotation of 45° in a counter clockwise direction which places the polarization orientations of all three beams into horizontal and vertical orientations. Thereafter, in layer 102a, vertically oriented polarization components 420a and 422a are walked upward by 0.5d so as to overlap their respective horizontal polarization components 420b and 422b. Thus, it can be seen in surface diagram A' that beam 420 has traveled from port 2 to port 3 and beam 422 has traveled from port 4 to port 5. At the same time, beam 424 (injected into port 6) has been rejected.

It should be appreciated that circulator 400 is highly advantageous in providing a high port count optical circulator having a configuration which is linearly expandable. Moreover, circulator 400 has advantages in common with optical devices described in the foregoing discussions. These advantages specifically encompass all the advantages described above relating to the configuration of the orthogonal walk-off polarization mixing arrangement 150 of the present invention. Other advantages associated with this design are that arrangements 150a and 150b can be identical and can thus be manufactured in double the quantity while using the same volume of crystal material as other designs. This allows an economy of scale. Likewise, because it is possible to independently make required alignment adjustments, the entire optical subassembly of the device from the fibers to the lens can be manufactured identically for both ends of the device.

Referring again to FIG. 13 still another advantage of polarization mixing arrangement 150 will be described. In particular, it should be remembered that polarization mixing arrangements 150a and 150b are essentially identical to previously described arrangement 150. In this regard, the operation of the nonreciprocal polarization rotation layers which make up these arrangements is accomplished by subjecting the layers to a magnetic field. The latter may be provided in any suitable way such as, for example, by permanent magnets (not shown) or by electromagnetism. The latter technique is illustrated in FIG. 13 wherein a pair of electromagnet coils 428a and 428b are diagrammatically illustrated surrounding polarization mixing arrangements 150a and 150b, respectively. The coils are electrically interconnected so as to produce magnetic field $M_f$ when current flows in one direction through the coils and so as to produce magnetic field $M_r$ when current flows in the other direction through the coils. Presence of the field $M_f$ results in circulator operation, as described above. That is, circulation from port 1 to port 2, from port 2 to port 3, from port 3 to port 4, etc. However, the presence of magnetic field $M_r$ reverses the circulation path. That is, light circulates from port 4 to port 3, from port 3 to port 2 and from port 2 to port 1. Therefore, optical device 400 may be utilized as an optical switch by changing the magnetic field directions as indicated in FIG. 13. Moreover, it should be appreciated that all optical device embodiments disclosed herein utilizing the configuration of polarization mixing arrangement 150 share this advantage.

Attention is now directed to FIGS. 18 and 19 which illustrate a fourth optical device manufactured in accordance with the present invention and generally indicated by the reference number 500. Device 500 comprises an optical circulator with three ports illustrated in the present Figures and will be referred to hereinafter as circulator 500. It should be appreciated that circulator 500, like previously disclosed devices, is linearly expandable. Fibers 1–3 are positioned in optical alignment with ports 1–3. The circulator includes polarization mixing arrangement 150 of the present invention. Once again, it is noted that arrangement 150 may be modified as to dimensions in order to suit the present circulator implementation. Arrangement 150 includes layers 102, 104, 106 and 108, as described above. Consistent with previous examples, surfaces in polarization mixing arrangement 150 are designated by the letters A–E. One additional surface F is defined by other components to be described immediately hereinafter.

Still referring to FIGS. 18 and 19, circulator 500 further includes previously described lenses 402 and 404. As noted above, GRIN lenses are employed in the present examples. However, any suitable type of lens may be used. The lenses and polarization mixing arrangement 150 are arranged in an aligned manner such that interface surfaces 122 and 126 of polarization mixing arrangement 150 are centered upon centerline 501 of the lenses. In addition, a corner mirror arrangement 502 is positioned on the opposite side of the lenses with respect to mixing arrangement 150. Corner mirror arrangement 502 includes mirrors 504a and 504b that are orthogonally arranged with respect to one another, as can be seen in the plane of FIG. 18. A line 506 is defined at the intersection of mirrors 504a and 504b. Line 506 is also centered on centerline 501 of the lenses. Lens 402 includes a focal length f1 while lens 404 includes a focal length f2. For purposes of simplicity, f1 is assumed to be equal to f2 in the present example. The input faces of fibers 1, 2 and 3 are positioned at focal length f1 from lens 402. The lenses are themselves separated by the distance f1+f2. Spacing between corner mirror 502 and lens 404 is defined in terms of path lengths l1 and l2 (FIG. 18). In particular, l1+l2/2=f2. l2 is equal to 2d in this case which is the combined vertical walk distance of layer 102 and both crystals 107a and 107b of layer 106. Fibers 1, 2 and 3 are separated from one another by the distance d. Fiber 2 is centered with respect to the width of the circulator as may be seen in FIG. 19. Once again, it is important to note the dimensions in FIGS. 18 and 19 have been significantly exaggerated for illustrative purposes.

Figure 20:
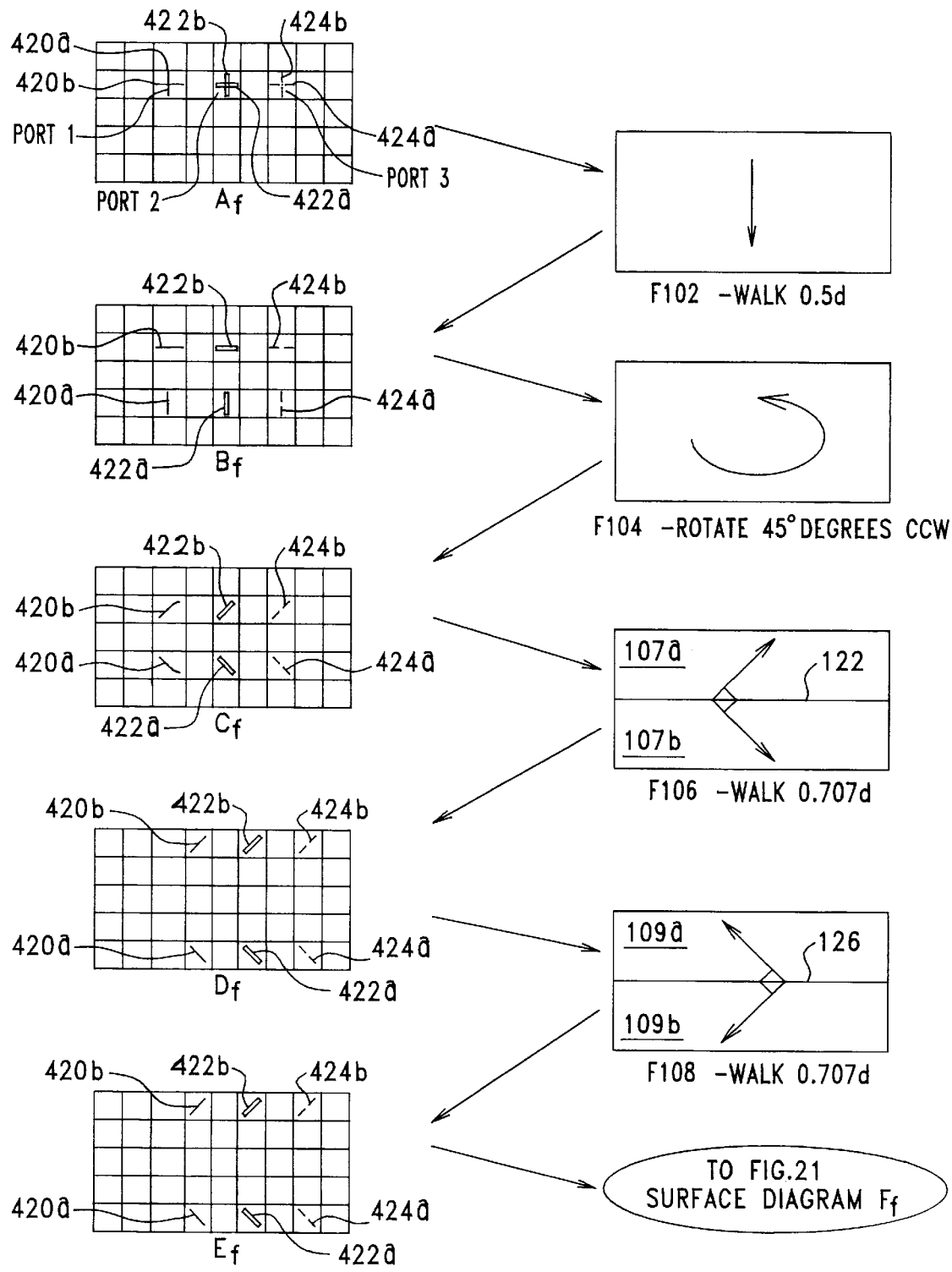
FIG. 20 is a diagrammatic illustration showing surface diagrams at positions along the path of light travel of the device of FIGS. 18 and 19 indicating the orientations of orthogonal polarization components of forward traveling light beams and also showing function diagrams depicting walk-off and rotation functions performed by each component of the device on the forward traveling light beams.
Figure 21:
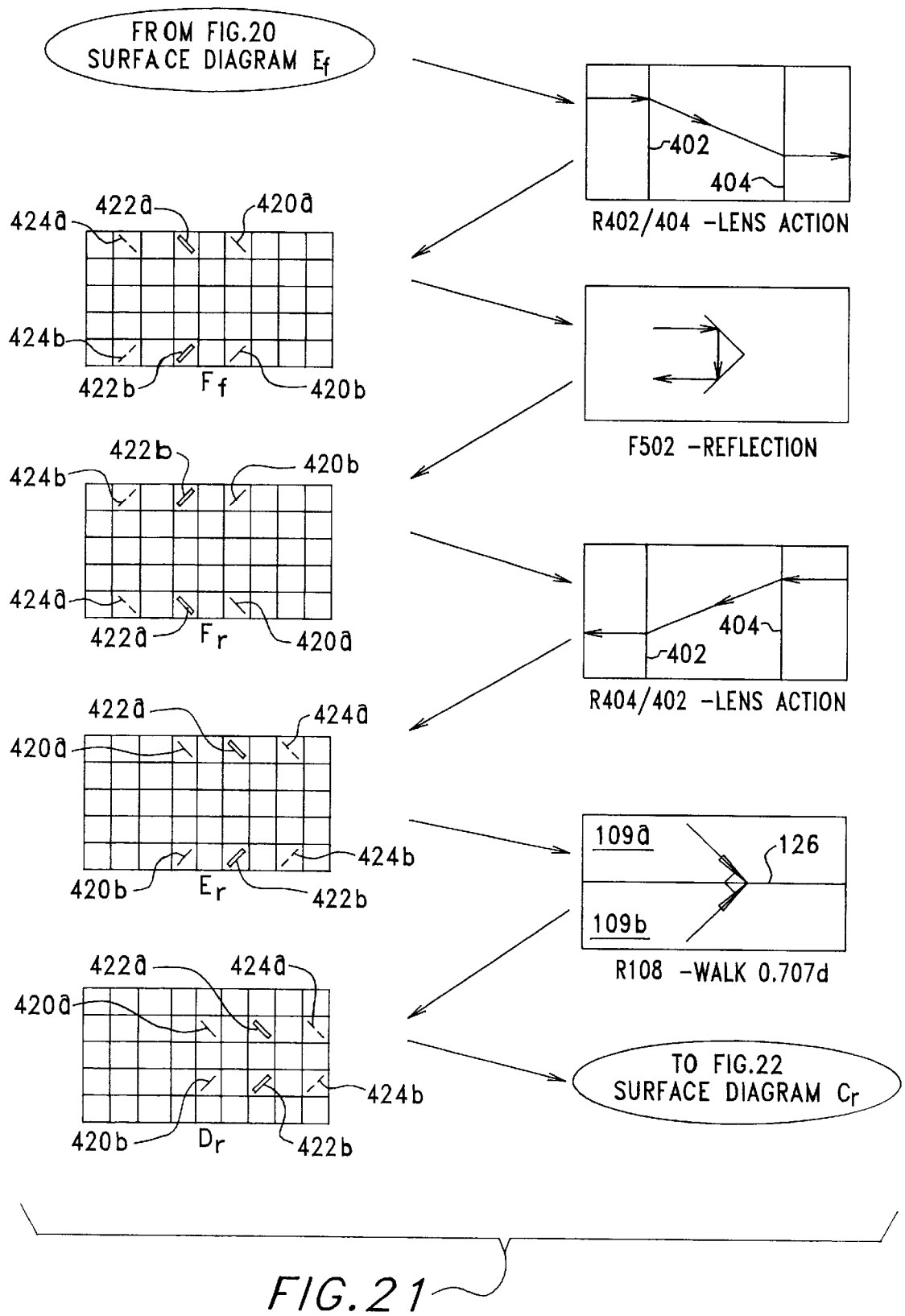
FIG. 21 is a diagrammatic illustration continuing from FIG. 20 showing surface diagrams at positions not shown in FIG. 14 during the forward and, subsequently, reverse travel of the beams, along with the orientations of the traveling beams at those surfaces.

Turning to FIG. 20 in conjunction with FIGS. 18 and 19, a description of the operation of circulator 500 will now be provided. In this regard, it should initially be appreciated that surface A defines all of the circulator's ports. Therefore, all light beams traveling through the circulator initially enter the circulator in the forward direction of travel as illustrated by beams 420, 422 and 424 (FIG. 19) which enter ports 1, 2 and 3, respectively. However, unlike the optical devices described above, these same light beams will be reversed in direction and ultimately emerge in the reverse direction from different ports defined on surface A, as will be described in detail below.

Still referring to FIGS. 18–20, it is noted that surface diagrams and function diagrams will be used in FIGS. 19 and 20 in a manner which is consistent with previous examples unless otherwise noted. For example, surface diagrams are designated here including an "f" or "r" subscript so as to clearly define the direction of travel being described. The thicknesses of birefringent layers are again established in terms of the quantity "X" (not shown) in accordance with the walk-off characteristics of the material that is used to form the walk-off layers in view of the fiber separation. Thus, a walk-off material having a 1X thickness will move the appropriate polarization component either vertically or horizontally by d or two grid positions within the matrix of illustrated positions in the appropriate surface diagrams. In terms of X, layer 102 includes a thickness of 1X while layers 106 and 108 have a thickness of 0.707X.

As noted, light beams 420, 422 and 424 enter ports 1, 2 and 3, respectively, at surface $A_f$. These beams include first and second orthogonal polarization components which are designated by appending the letter "a" or "b" to the appropriate reference number, as above. In layer 102, the vertically oriented polarization components 420a, 422a and 424a are walked downward by distance 0.5d as indicated in function diagram F102. The path over which polarization component 420a travels is traced in FIGS. 18 and 19 in order to facilitate the reader's understanding. Polarization rotation layer F104 rotates the polarization components by 45 degrees in a counter clockwise direction (F104) so as to arrive at surface $B_f$ in the indicated orientations. Layer 106 then provides a diagonal walk-off of 0.707d having components of movement both away from and parallel to interface surface 122, as illustrated in function diagram F106, prior to the beams arriving at surface $D_f$. For polarization component 420a, the vertical component of this walk-off is seen in FIG. 18 while the horizontal component of the movement is seen in FIG. 19. The beams experience no walk-off in layer 109, since the orientations of the polarization components are orthogonal to the walk-off directions defined by layer 109. The three forward traveling beams then exit from polarization mixing arrangement 150 at surface $E_f$.

Turning to FIGS. 18–21, the beams then travel through lenses 402 and 404 to surface $F_f$. The lumped effect of the lenses in function diagram F402/404 results in a mirror image of the polarization components as shown in surface diagram $F_f$. Thereafter, the beams encounter corner mirror 502. In essence, the corner mirror serves to vertically interchange polarization components, as is evident from the path followed by component 420a shown in FIG. 18, and redirect the beams in the reverse direction. The effect of the corner mirror is seen by comparison of surface diagrams $F_f$ and $F_r$.

In the reverse direction, the beams again encounter lenses 404 and 402 resulting in the polarization component arrangement of surface diagram $E_r$. Next, the beams reenter polarization mixing arrangement 150. In layer 108, the polarization components of the beams experience orthogonal walk-offs having components of movement both towards and parallel to interface surface 126 so as to be arranged as shown in surface diagram $D_r$. For polarization component 420a, the vertical component of this walk-off is seen in FIG. 18 while the horizontal component of the movement is seen in FIG. 19. No walk-off occurs in layer 106 as illustrated by surface diagram $C_r$.

Figure 22:
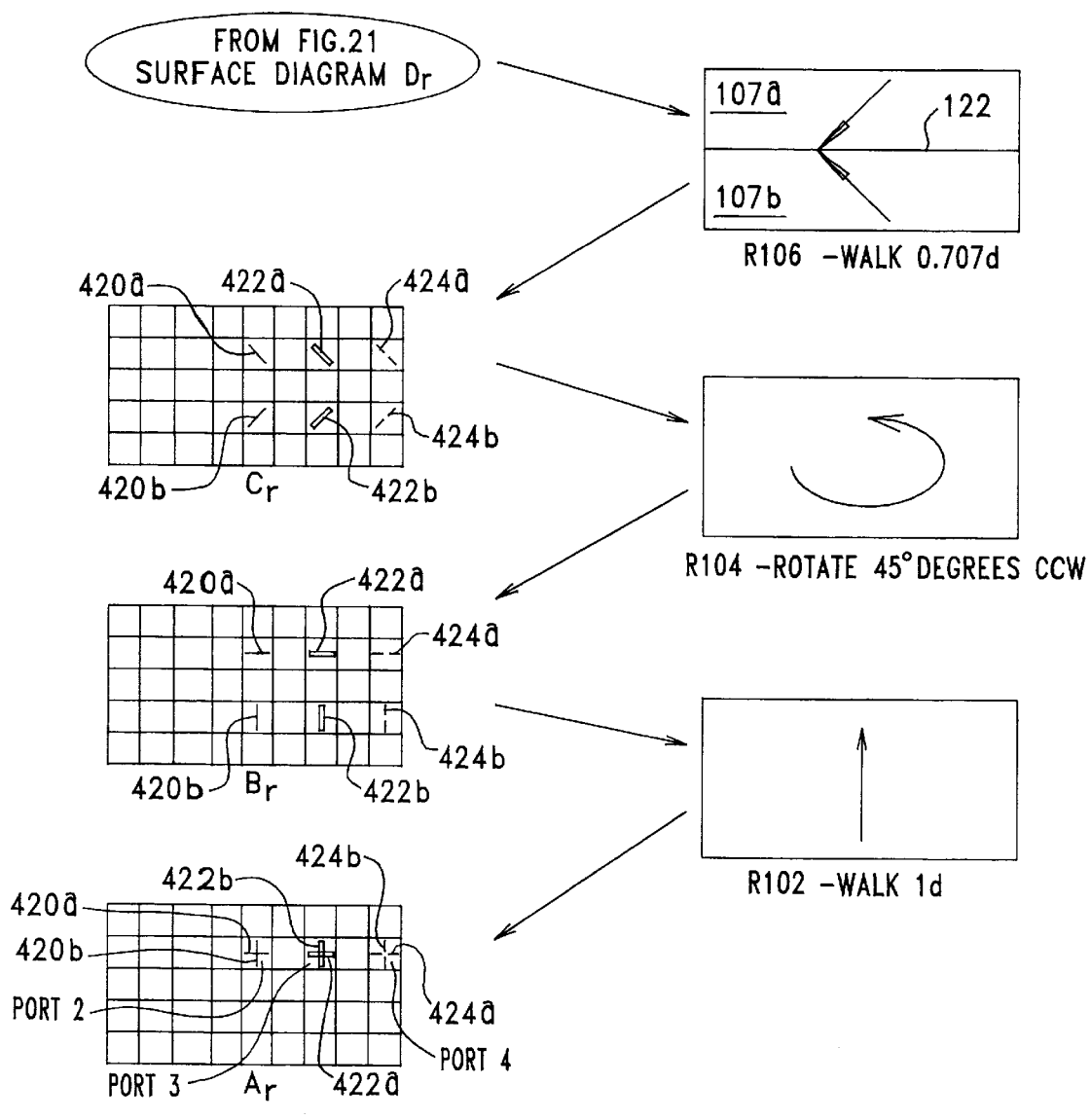
FIG. 22 is a diagrammatic illustration continuing from FIG. 21 completing the depiction of travel of the light beams in the reverse direction.

Referring to FIG. 22 in conjunction with FIGS. 18–21, layer 104 provides a 45 degree polarization rotation in a counter clockwise direction as shown by surface diagram $B_r$. Layer 102 then serves to walk polarization components 420b, 422b and 424b upward by d so as to overlap components 420a, 422a and 424a, respectively, as seen in surface diagram $A_r$. By comparison of surface diagrams $A_r$ and $A_f$, it is evident that beam 420 has emerged at port 2, beam 422 has emerged at port 3 and, in fact, beam 424 has emerged at a port 4.

One of ordinary skill in the art will appreciate that circulator 500 is highly advantageous with regard to linear expansion. The latter is accomplished by simple extension of the lateral extents of the device along the direction defined between the ports. While four ports are illustrated in the present example, it is submitted that six or more ports may be provided by this configuration. It is also considered advantageous in that all ports are provided on a single surface so as to provide for ease of access and connectivity. Moreover, circulator 500 also shares the advantages in common with optical devices described in the foregoing discussions with regard to the orthogonal walk-off polarization mixing arrangement 150 of the present invention. In addition, this design may be produced at lower cost due to the fact that fewer crystal elements are required and fewer alignment steps are necessary.

Since the optical circulators and associated method disclosed herein may be provided in a variety of different configurations and the method may be practiced in a variety of different ways, it should be understood that the present invention may be embodied in many other specific ways without departing from the spirit or scope of the invention. Therefore, the present examples and methods are to be considered as illustrative and not restrictive, and the invention is not to be limited to the details given herein, but may be modified within the scope of the appended claims.

What is claimed is:

1. In an optical device which is designed to act at least on a first light signal passing therethrough which light signal can be orthogonally polarized and which device has (i) a first end defining at least a first port (ii) a second, opposing end and (iii) a length between said first and second ends along which said light signal travels, the improvement comprising:
   a walk-off arrangement arranged along said length and configured for simultaneously moving the orthogonal polarization components of the first light signal in at least first and second orthogonal directions.

2. The improvement of claim 1 wherein said second end defines at least a second port and said light signal travels from the first end towards the second end.

3. The improvement of claim 1 wherein said arrangement includes at least one crystal pair including first and second crystals, each of which includes an attachment face, the attachment faces being attached to one another so as to form an interface between the first and second crystals, said interface being arranged generally along said length such that said first light signal is acted on in a predetermined way as the light signal passes through said crystal pair by simultaneously moving said first and second orthogonal polarization components of said first light signal in said first and second orthogonal directions, which orthogonal directions include a component of movement that is generally perpendicular to said interface.

4. The improvement of claim 3 wherein said first and second crystals are walk-off crystals having a walk-off direction and wherein the walk-off directions of the first and second crystals are arranged generally orthogonal to one another, at an angle of approximately 45° to said interface and generally transverse to said length such that said first and second polarization components are moved equal distances perpendicular to and parallel with said interface as the components travel through the first and second crystals.

5. The improvement of claim 4 wherein said crystal pair is configured such that the perpendicular movement of said first and second polarization components is away from said interface as the polarization components pass through said crystal pair so that contact of the first and second polarization components with said interface is minimized.

6. In a method of controlling light within an optical device which is designed to act at least on a first light signal passing therethrough which light signal can be orthogonally polarized and which device has (i) a first end defining at least a first port (ii) a second, opposing end and (iii) a length between said first and second ends along which said first light signal travels, the improvement comprising the steps of:
   configuring a walk-off arrangement along said length for simultaneously moving the orthogonal polarization components of the first light signal in at least first and second orthogonal directions.

7. The improvement of claim 6 wherein said second end defines at least a second port and said first light signal travels from said first end to said second end and wherein said walk-off arrangement is configured to serve in causing the first light signal to travel from the first port to the second port.

8. The improvement of claim 6 further comprising the steps of configuring said walk-off arrangement by (i) providing first and second crystals each of which includes an attachment face for use in forming a crystal pair, (ii) attaching the attachment faces of the first and second crystals to one another so as to form said crystal pair having an interface between the first and second crystals and (iii) arranging the crystal pair such that said interface lies generally parallel with said length and so that said first light signal passes through the crystal pair and is acted on in said first and second orthogonal directions as the signals pass therethrough by moving the first and second orthogonal polarization component of said first light signal in said first and second orthogonal directions, which orthogonal directions include a component of movement that is generally perpendicular to said interface.

9. The improvement of claim 6 wherein said first and second crystals are walk-off crystals having a first and a second walk-off direction and wherein the attachment faces are attached with one another such that the walk-off directions of the first and second crystals are arranged generally orthogonal to one another corresponding to said first and second orthogonal directions, said first and second walk-off directions being arranged at an angle of approximately 45° to said interface and generally transverse to said length such that said first and second orthogonal polarization components are moved equal distances perpendicular to and parallel with said interface as the components travel through the first and second crystals.

10. The improvement of claim 9 wherein the walk-off directions of said first and second crystals are arranged such that the perpendicular movement of said first and second orthogonal polarization components is away from said interface as the first and second polarization components of said first light signal pass through said first and second crystals, respectively, so that clipping of the first and second polarization components of the first light signal caused by said interface is minimized.

11. An optical device designed to perform a predetermined function on at least a first light signal passing therethrough, which first light signal is polarizable into first and second orthogonal components, the device including a first end having a first port for receiving said first light signal, an opposing second end and a length therebetween along which the first light signal travels, said device comprising:
   a) a first arrangement defining said first port and positioned along said length including a first walk-off configuration for simultaneously moving the orthogonal polarization components of the first light signal in first and second orthogonal directions to perform at least one step in providing said predetermined function; and
   b) a second arrangement of optical elements positioned along said length defining said second end and being in optical communication with said first arrangement for cooperating with said first arrangement in a way which implements other steps in providing said predetermined function.

12. The device of claim 11 wherein said second end defines a second port and said first light signal travels from the first end towards the second end along said length.

13. The device of claim 11 wherein said predetermined function is optical circulation.

14. The device of claim 11 wherein said first walk-off configuration includes at least a first crystal pair having first and second crystals, each of which includes an attachment face, the attachment faces being attached to one another so as to form a first junction between the first and second crystals, said first junction being arranged generally along said length such that said first light signal is acted on as the first light signal passes through said first crystal pair by simultaneously moving the first and second orthogonal polarization components of said first light signal in said first and second orthogonal directions, respectively, which orthogonal directions include first and second components of movement that are perpendicular to said first junction.

15. The device of claim 14 wherein said first arrangement includes a walk-off element defining said first port and being in optical communication with said first crystal pair for providing said first and second orthogonally polarized components of said first light signal to said first crystal pair such that the first polarization component enters the first crystal and the second polarization component enters the second crystal.

16. The device of claim 15 wherein said first arrangement includes a polarization rotation element positioned between said walk-off element and said first crystal pair for rotating the first and second polarization components of said first light signal such that the first polarization component is generally aligned with said first orthogonal direction and the second polarization component is generally aligned with said second orthogonal direction.

17. The device of claim 14 wherein the first and second components of movement are in opposing directions on opposite sides of and away from said first junction.

18. The device of claim 14 wherein said second end defines a second port and said first light signal travels from the first end towards the second end along said length and said device is configured for performing said predetermined function on a second light signal in addition to said first light signal, said second light signal being orthogonally polarizable into first and second orthogonal components entering said second port and traveling along said length towards said first port and wherein said first walk-off configuration is further configured for at least in part performing said predetermined function by simultaneously moving the orthogonal polarization components of the second light signal in third and fourth orthogonal directions.

19. The device of claim 18 wherein said first walk-off configuration includes a second crystal pair having third and fourth crystals, each of which includes an attachment face, the attachment faces of the third and fourth crystals being attached to one another so as to form a second junction between the third and fourth crystals, said second junction being arranged generally along said length and coplanar with said first junction for simultaneously moving the first and second polarization components of the second light signal in said third and fourth orthogonal directions, respectively, such that said first orthogonal direction is substantially parallel with said third orthogonal direction and said second orthogonal direction is substantially parallel with said fourth orthogonal direction which third and fourth orthogonal directions include third and fourth components of movement that are perpendicular to said second junction.

20. The device of claim 19 wherein the third and forth components of movement are in opposing directions on opposite sides of and towards said second junction.

21. The device of claim 19 wherein said second arrangement includes a polarization rotation element configured to provide non-reciprocal polarization rotations of said first and second light signals so as to serve to at least in part provide said predetermined function.

22. The device of claim 21 wherein said second arrangement of optical elements includes a walk-off element arranged between said polarization element along said distance between said polarization element and said second port and in optical communication with the polarization element and the second end to provide walk-offs of certain ones of the first and second orthogonal polarization components of the first and second light signals.

23. The device of claim 22 wherein said second arrangement includes a phase compensation element having one end arranged adjacent to said walk-off element and another end defining said second port such that a specific delay is imparted between the first and second light signals passing therethrough.

24. The device of claim 11 wherein said second arrangement of optical elements includes a lens arrangement for producing a mirror image of the orthogonal polarization components of said first light signal.

25. The device of claim 24 wherein said lens arrangement includes a pair of lenses positioned along said length.

26. The device of claim 25 wherein said lenses are GRIN lenses.

27. The device of claim 11 wherein said second arrangement of optical components includes a corner mirror positioned for receiving said first and second orthogonal polarization components on first and second paths, respectively, in a forward direction and for returning said first polarization component on said second path in a reverse direction while returning said second polarization component on said first path in said reverse direction.

28. The device of claim 11 wherein said second arrangement of optical elements includes (i) a lens arrangement which produces a mirror image of the first and second orthogonal polarization components of said first light signal traveling along a first path and a second path, respectively, and (ii) a corner mirror positioned for receiving said first and second orthogonal polarization components on said first and second paths, respectively, in the forward direction and for returning said first polarization component to the lens arrangement on said second path in a reverse direction while returning said second polarization component to the lens arrangement on said first path in said reverse direction.

29. The device of claim 28 wherein said lens arrangement includes a pair of lenses positioned along said length.

30. The device of claim 29 wherein said lenses are GRIN lenses.

31. The device of claim 11 wherein said second arrangement includes a second walk-off configuration for simultaneously moving the orthogonal polarization components of the first light signal in directions opposing said first and second orthogonal directions so as to counteract the simultaneous orthogonal movement provided by the first arrangement.

32. In an optical device which is designed to act on a light signal passing through a length thereof which light signal can be orthogonally polarized into a particular polarization state having first and second orthogonal polarization components, the improvement comprising:

a walk-off arrangement including a first crystal pair and a second crystal pair, the first crystal pair including first and second crystals and the second crystal pair including third and fourth crystals, the crystals including first, second, third and fourth attachment faces, respectively, the first and second attachment faces being attached to one another so as to form a first interface between the first and second crystals, and the third and fourth attachment faces being attached to one another so as to form a second interface between the third and fourth crystals, said first and second interfaces being arranged in a coplanar manner adjacent one another generally along said length such that said light signal in said particular polarization state is acted on in a predetermined way as the signal passes through either the first or second crystal pair and so that the light signal in said particular polarization state is not acted on as it passes through the other one of the first and second crystal pair.

33. The improvement of claim 32 wherein said arrangement is configured for acting on said particular polarization state of said light signal in said predetermined way by simultaneously moving the first and second orthogonal polarization components in opposing first and second orthogonal directions, respectively, which orthogonal directions include a component of movement that is generally perpendicular to the first and second interfaces.

34. The improvement of claim 33 wherein said first, second, third and fourth crystals include first, second, third and fourth walk-off directions, respectively, and wherein said first and second walk-off directions are orthogonal with respect to one another and are arranged at an angle of approximately 45° to said first and second interface surfaces and generally transverse to said length such that said first and second orthogonal polarization components are simultaneously moved equal distances perpendicular to and parallel with said first and second interface surfaces as the polarization components travel through said walk-off arrangement.

35. The improvement of claim 34 wherein said first and third crystals are located adjacent one another on one side of said first and second interface surfaces and said second and fourth crystals are located adjacent one another on the other side of said first and second interface surfaces and wherein the first walk-off direction of the first crystal is orthogonal to the third walk-off direction of the third crystal and the second walk-off direction of the second crystal is orthogonal to the fourth walk-off direction of the fourth crystal.

36. The improvement of claim 33 wherein first and second polarization components of said light signal are moved equal distances away from said first and second interfaces.

37. The improvement of claim 33 wherein first and second polarization components of said light signal are moved equal distances toward said first and second interfaces.

38. An optical circulator which is designed to act on a plurality of light signals in a way which provides optical circulation of the signals by the signals passing through a length defined between a first end and a second end in a forward or a reverse direction, which light signals can each be orthogonally polarized into first and second orthogonal polarization components, said circulator comprising a) first and second walk-off arrangements each having an input/output end for defining said first and second ends, respectively, and an opposing interface end, the first and second walk-off arrangements being configured for simultaneously moving the orthogonal polarization components of certain ones of the light signals in first and second orthogonal directions and simultaneously moving the orthogonal polarization components of other ones of the light signals in third and fourth orthogonal directions; and b) an optical arrangement positioned between the interface ends of said first and second walk-off arrangements and in optical communication therewith for (i) producing a mirror image of the polarization components traveling in said forward direction from the first walk-off arrangement to the second walk-off arrangement and of the polarization components traveling in said reverse direction from the second walk-off arrangement to the first walk-off arrangement and (ii) providing a predetermined polarization rotation of said polarization components traveling in said forward and reverse directions such that said optical circulation is provided.

39. The circulator of claim 38 wherein said predetermined polarization rotation is approximately 90°.

40. The circulator of claim 38 wherein said first and second walk-off arrangements are identical.

41. The circulator of claim 38 wherein said first walk-off arrangement includes at least a first crystal pair having first and second crystals, each of which includes an attachment face, the attachment faces being attached to one another so as to form a first junction between the first and second crystals, said first junction being arranged generally along said length such that said certain ones of said light signals are acted on while passing through said first crystal pair by simultaneously moving the first and second orthogonal polarization components of these certain light signals in the first and second orthogonal directions, respectively, which orthogonal directions include first and second components of movement that are perpendicular to said first junction.

42. The circulator of claim 41 wherein the first and second components of movement are in opposing directions on opposite sides of and away from said first junction.

43. The circulator of claim 41 wherein said first walk-off arrangement includes a second crystal pair having third and fourth crystals, each of which includes an attachment face, the attachment faces of the third and fourth crystals being attached to one another so as to form a second junction between the third and fourth crystals, said second junction being arranged generally along said length and coplanar with said first junction such that other ones of said light signals are acted on as these other ones of the light signals pass through said second crystal pair in said reverse direction by simultaneously moving the first and second orthogonal polarization components of these other light signals in said third and fourth orthogonal directions, respectively, such that said first orthogonal direction is orthogonal to said third orthogonal direction and said second orthogonal direction is orthogonal to said fourth orthogonal direction which third and fourth orthogonal directions include third and fourth components of movement that are perpendicular to said second junction.

44. The circulator of claim 43 wherein the third and forth components of movement are in opposing directions on opposite sides of and towards said second junction.

45. The circulator of claim 41 wherein said first walk-off arrangement includes a walk-off element forming the input/output end which defines said first end and being in optical communication with said first crystal pair for providing said first and second orthogonally polarized components of said light signals traveling in said forward direction to said first crystal pair such that the first polarization component enters the first crystal and the second polarization component enters the second crystal.

46. The circulator of claim 45 wherein said first walk-off arrangement includes a polarization rotation element positioned between said walk-off element and said first crystal pair for rotating the first and second polarization components of said forward traveling light signals in one direction and for rotating the first and second polarization components of said reverse traveling light signals in an opposite direction.

47. The circulator of claim 46 wherein said polarization rotation element rotates the first and second polarization components of said forward traveling light signals such that their first polarization components are generally aligned with said first and second orthogonal directions, respectively, of said first crystal pair.

48. The circulator of claim 38 wherein said first walk-off arrangement includes a first crystal pair and a second crystal pair, the first crystal pair including first and second crystals and the second crystal pair including third and fourth crystals, the crystals including first, second, third and fourth attachment faces, respectively, the first and second attachment faces being attached to one another so as to form a first interface between the first and second crystals, and the third and fourth attachment faces being attached to one another so as to form a second interface between the third and fourth crystals, said first and second interfaces being arranged in a coplanar manner adjacent one another generally along said length such that said light signals traveling in said forward direction are simultaneously moved in the first and second orthogonal directions.

49. The circulator of claim 48 wherein said first and second orthogonal directions include a component of movement that is generally perpendicular to the first and second interfaces.

50. The circulator of claim 49 wherein said first, second, third and fourth crystals include first, second, third and fourth walk-off directions, respectively, and wherein said first and second walk-off directions are arranged at an angle of approximately 45° to said first and second interface surfaces and generally transverse to said length such that said first and second orthogonal polarization components are moved equal distances perpendicular to and parallel with said first and second interface surfaces as the polarization components travel through said arrangement.

51. The circulator of claim 50 wherein said first and third crystals are located adjacent one another on one side of said first and second interface surfaces and said second and fourth crystals are located adjacent one another on the other side of said first and second interface surfaces and wherein the first walk-off direction of the first crystal is orthogonal to the third walk-off direction of the third crystal and the second walk-off direction of the second crystal is orthogonal to the fourth walk-off direction of the fourth crystal.

52. The circulator of claim 38 wherein said second walk-off arrangement includes at least a first crystal pair having first and second crystals, each of which includes an attachment face, the attachment faces being attached to one another so as to form a first junction between the first and second crystals, said first junction being arranged generally along said length such that said certain ones of said light signals are acted on while passing through said first crystal pair by simultaneously moving the first and second orthogonal polarization components of these certain light signals in the first and second orthogonal directions, respectively, which orthogonal directions include first and second components of movement that are perpendicular to said first junction.

53. The circulator of claim 52 wherein the first and second components of movement are in opposing directions on opposite sides of and away from said first junction.

54. The circulator of claim 53 wherein said certain light signals are traveling in the reverse direction.

55. The circulator of claim 52 wherein said second walk-off arrangement includes a second crystal pair having third and fourth crystals, each of which includes an attachment face, the attachment faces of the third and fourth crystals being attached to one another so as to form a second junction between the third and fourth crystals, said second junction being arranged generally along said length and coplanar with said first junction such that other ones of said light signals are acted on as these other ones of the light signals pass through said second crystal pair by simultaneously moving the first and second orthogonal polarization components of these other light signals in said third and fourth orthogonal directions, respectively, such that said first orthogonal direction is orthogonal to said third orthogonal direction and said second orthogonal direction is orthogonal to said fourth orthogonal direction which third and fourth orthogonal directions include third and fourth components of movement that are perpendicular to said second junction.

56. The circulator of claim 55 wherein the third and forth components of movement are in opposing directions on opposite sides of and towards said second junction.

57. The circulator of claim 52 wherein said second walk-off arrangement includes a walk-off element forming the input/output end which defines said second end and being in optical communication with said first crystal pair for providing said first and second orthogonally polarized components of said light signals traveling in said reverse direction to said first crystal pair such that the first polarization component enters the first crystal and the second polarization component enters the second crystal.

58. The circulator of claim 57 wherein said second walk-off arrangement includes a polarization rotation element positioned between said walk-off element and said first crystal pair for rotating the first and second polarization components of said reverse traveling light signals in one direction and for rotating the first and second polarization components of said forward traveling light signals in an opposite direction.

59. The circulator of claim 58 wherein said polarization rotation element rotates the first and second polarization components of said reverse traveling light signals such that their first polarization components are generally aligned with said first and second orthogonal directions, respectively, of said first crystal pair.

60. The circulator of claim 38 wherein said second walk-off arrangement includes a first crystal pair and a second crystal pair, the first crystal pair including first and second crystals and the second crystal pair including third and fourth crystals, the crystals including first, second, third and fourth attachment faces, respectively, the first and second attachment faces being attached to one another so as to form a first interface between the first and second crystals, and the third and fourth attachment faces being attached to one another so as to form a second interface between the third and fourth crystals, said first and second interfaces being arranged in a coplanar manner adjacent one another generally along said length such that said light signals traveling in said reverse direction are simultaneously moved in the first and second orthogonal directions.

61. The circulator of claim 60 wherein said first and second orthogonal directions include a component of movement that is generally perpendicular to the first and second interfaces.

62. The circulator of claim 60 wherein said first, second, third and fourth crystals include first, second, third and fourth walk-off directions, respectively, and wherein said first and second walk-off directions are arranged at an angle of approximately 45° to said first and second interface surfaces and generally transverse to said length such that said first and second orthogonal polarization components are moved equal distances perpendicular to and parallel with said first and second interface surfaces as the polarization components travel through said arrangement.

63. The circulator of claim 62 wherein said first and second orthogonal directions of movement move the first and second polarization components of said light signals away from said first and second interfaces.

64. The circulator of claim 60 wherein said first and third crystals are located adjacent one another on one side of said first and second interface surfaces and said second and fourth crystals are located adjacent one another on the other side of said first and second interface surfaces and wherein the first walk-off direction of the first crystal is orthogonal to the third walk-off direction of the third crystal and the second walk-off direction of the second crystal is orthogonal to the fourth walk-off direction of the fourth crystal.

65. An optical device designed to act at least on first and second light signals passing therethrough, which light signals are polarizable into first and second orthogonal components, the device including a first end having a first port for receiving said first light signal and an opposing, second end having a second port for receiving said second light signal, said device comprising:

a) means including a first surface at said first end and defining at least said first port, an opposing, second surface at a position between the first end and the second end and a length defined between the first and second surfaces along which said first and second light signals pass in opposing forward and reverse directions, respectively, for interacting in a first way with the polarization components of the first and second light signals serving to at least in part provide a mixed polarization state of the orthogonal polarization components of the first and second light signals at said second surface, said means including a walk-off arrangement arranged along said length configured for simultaneously moving the orthogonal polarization components of the first or second light signal in at least first and second orthogonal directions so as to serve as one step in providing the mixed polarization state of the first and second light signals at said second surface; and b) an arrangement of optical elements defining an interface surface in optical communication with the second surface of said means and defining said second end including said second port at a distance from said interface surface, said optical element arrangement being configured for cooperating with said means in a second way which serves at least in part to provide said mixed polarization state of the orthogonal polarization components of said first and second light signals at said interface surface.

* * * * *